United States Patent
Roy et al.

(10) Patent No.: US 12,539,926 B2
(45) Date of Patent: Feb. 3, 2026

(54) TRACK ASSEMBLY HAVING A ROTATION LIMITING DEVICE AND VEHICLE HAVING SAME

(71) Applicant: BOMBARDIER RECREATIONAL PRODUCTS INC., Valcourt (CA)

(72) Inventors: Charles Roy, Orford (CA); Kevin Poirier, Racine (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 982 days.

(21) Appl. No.: 17/592,932

(22) Filed: Feb. 4, 2022

(65) Prior Publication Data

US 2023/0249764 A1 Aug. 10, 2023

(51) Int. Cl.
| | |
|---|---|
| *B62D 55/104* | (2006.01) |
| *B62D 55/065* | (2006.01) |
| *B62D 55/10* | (2006.01) |
| *B62D 55/12* | (2006.01) |
| *B62D 55/14* | (2006.01) |

(52) U.S. Cl.
CPC ......... *B62D 55/104* (2013.01); *B62D 55/065* (2013.01); *B62D 55/10* (2013.01); *B62D 55/12* (2013.01); *B62D 55/14* (2013.01)

(58) Field of Classification Search
CPC ...... B62D 55/065; B62D 55/10; B62D 55/12; B62D 55/14; B62D 55/104
USPC ....................................................... 180/9.21
See application file for complete search history.

(56) References Cited

U.S. PATENT DOCUMENTS

| | | | |
|---|---|---|---|
| 4,702,843 A | 10/1987 | Oswald et al. | |
| 5,944,134 A * | 8/1999 | Peppel | B62D 55/108 |
| | | | 180/9.5 |
| 7,883,099 B2 * | 2/2011 | Byers | B60G 15/067 |
| | | | 280/124.135 |

(Continued)

FOREIGN PATENT DOCUMENTS

| | | | | |
|---|---|---|---|---|
| CA | 2756859 A1 | 5/2012 | | |
| CN | 115384617 A * | 11/2022 | ............. | B62D 55/08 |

(Continued)

OTHER PUBLICATIONS

English Translation CN-115384617-A (Year: 2024).*
English Translation RU-2672346-C2 (Year: 2024).*

*Primary Examiner* — James A English
*Assistant Examiner* — Nathaniel William Watkins
(74) *Attorney, Agent, or Firm* — BCF LLP

(57) ABSTRACT

A track assembly for a vehicle is provided. The vehicle has a suspension arm for connecting the track assembly to the vehicle. The track assembly includes a frame, a plurality of track-contacting wheels, and an endless track disposed around the track-contacting wheels. The track-contacting wheels include: a drive wheel rotationally connected to the frame and at least one idler wheel rotationally connected to the frame. The drive wheel defines a drive wheel axis about which the drive wheel is rotatable. The drive wheel is adapted for driving the endless track. The track assembly also includes a rotation limiting device for limiting rotation of the track assembly relative to the suspension arm of the vehicle. The rotation limiting device is connected to the frame of the track assembly and is configured to be connected to the suspension arm of the vehicle.

20 Claims, 18 Drawing Sheets

(56) References Cited

U.S. PATENT DOCUMENTS

| | | | | |
|---|---|---|---|---|
| 8,480,106 B1* | 7/2013 | Cohen | ................ | B60G 17/005 |
| | | | | 280/5.502 |
| 8,794,358 B2 | 8/2014 | Hansen | | |
| 9,211,921 B2 | 12/2015 | Zuchoski et al. | | |
| 9,505,451 B2 | 11/2016 | Zuchoski et al. | | |
| 9,656,703 B2 | 5/2017 | Zuchoski et al. | | |
| 10,940,902 B2* | 3/2021 | Marchildon | ........... | B62D 55/04 |
| 11,992,781 B2 | 5/2024 | Wood et al. | | |
| 2004/0140138 A1* | 7/2004 | Brazier | ................ | B62D 55/104 |
| | | | | 180/9.21 |
| 2009/0194963 A1* | 8/2009 | Tomlin | ................... | B60G 11/27 |
| | | | | 280/124.116 |
| 2011/0048816 A1* | 3/2011 | Bessette | ............... | B62D 55/104 |
| | | | | 180/9.1 |
| 2011/0315459 A1* | 12/2011 | Zuchoski | ............... | B62D 55/02 |
| | | | | 701/1 |
| 2012/0104840 A1* | 5/2012 | Zuchoski | ............... | B62D 55/10 |
| | | | | 305/142 |
| 2018/0265146 A1 | 9/2018 | Laplante et al. | | |
| 2020/0339200 A1* | 10/2020 | Couture | ............... | B62D 55/065 |

FOREIGN PATENT DOCUMENTS

| | | | | |
|---|---|---|---|---|
| RU | 2672346 C2 * | 11/2018 | ............ | B62M 27/02 |
| WO | 2019014757 A1 | 1/2019 | | |

* cited by examiner

TRACK ASSEMBLY HAVING A ROTATION LIMITING DEVICE AND VEHICLE HAVING SAME

FIELD OF THE TECHNOLOGY

The present technology relates to a track assembly having a rotation limiting device and to a vehicle having such a track assembly.

BACKGROUND

All-terrain vehicles (ATVs) and similar vehicles are used for utility and recreational purposes. Some ATVs are configured to be interchangeably equipped with ground-engaging wheels or track assemblies, such as to allow a user to equip an ATV with either option in accordance with terrain conditions and/or desired handling performance. Track assemblies are particularly useful for instance when travelling over deep snow as the increased contact area between the track assemblies' tracks and the ground allows for greater floatation.

To facilitate travel over rough terrain, track assemblies are designed to pivot about a drive wheel axis thereof which allows the track assemblies to overcome obstacles such as fallen trees, rocks, uneven ground, etc. by climbing over them. In order to prevent the track assemblies from coming into contact with the body of the ATV (and any ensuing damage therefrom) as they pivot about their respective drive wheel axes, each track assembly will typically be provided with a rotation limiting device (also commonly referred to as an "anti-rotation device") to limit the rotation of the track assembly about the drive wheel axis. Notably, such conventional rotation limiting devices are connected between a frame of the ATV and the track assembly. However, in some cases, the frame of the ATV may not lend itself to be readily connected to the rotation limiting device. For instance, the frame of the ATV may be designed in such a way that a distance between the rotation limiting device and any suitable location on the frame for connection to the rotation limiting device may be too great such that such a connection is not easily and/or inexpensively feasible.

Thus, there is a desire for a track assembly having a rotation limiting device that addresses some of the aforementioned drawbacks.

SUMMARY

It is an object of the present technology to ameliorate at least some of the inconveniences present in the prior art.

According to an aspect of the present technology, there is provided a track assembly for a vehicle. The vehicle has a suspension arm for connecting the track assembly to the vehicle. The track assembly includes: a frame, a plurality of track-contacting wheels and an endless track disposed around the track-contacting wheels. The track-contacting wheels include a drive wheel rotationally connected to the frame and at least one idler wheel rotationally connected to the frame. The drive wheel is adapted for driving the endless track and defines a drive wheel axis about which the drive wheel is rotatable. The track assembly also includes a rotation limiting device for limiting rotation of the track assembly relative to the suspension arm of the vehicle. The rotation limiting device is connected to the frame of the track assembly and is configured to be connected to the suspension arm of the vehicle.

In some embodiments, the track has an outer lateral edge and an inner lateral edge, and the rotation limiting device is entirely disposed laterally between the outer and inner lateral edges of the track.

In some embodiments, the rotation limiting device is entirely disposed laterally between the drive wheel and the inner lateral edge of the track.

In some embodiments, the rotation limiting device includes an elongate support and a plurality of biasing members supported by the elongate support.

In some embodiments, the elongate support is disposed vertically lower than the drive wheel axis.

In some embodiments, the rotation limiting device also includes a suspension arm attachment for connecting the rotation limiting device to the suspension arm of the vehicle. The suspension arm attachment is configured to remain attached to the suspension arm when the track assembly is uninstalled from the vehicle.

In some embodiments, the suspension arm attachment is configured to lock the rotation limiting device to the suspension arm of the vehicle to prevent the suspension arm attachment from rotating relative to the suspension arm of the vehicle.

In some embodiments, the track assembly also includes a fastener configured to engage the suspension arm attachment and a portion of the suspension arm to lock the rotation limiting device to the suspension arm.

In some embodiments, the suspension arm attachment includes a clamp configured to at least partially surround a portion of the suspension arm of the vehicle.

In some embodiments, the suspension arm attachment has an upper portion and a lower portion. The lower portion of the suspension arm attachment is connected to the elongate support. The upper portion of the suspension arm attachment is configured to be connected to the suspension arm of the vehicle.

In some embodiments, the track has an outer lateral edge and an inner lateral edge and the lower portion of the suspension arm attachment is disposed vertically lower than the suspension arm and laterally between the outer and inner lateral edges of the track.

In some embodiments, the track assembly also includes a connection bracket for connecting the rotation limiting device to the frame of the track assembly. The connection bracket has a frame connecting end connected to the frame of the track assembly and a device connecting end connected to the rotation limiting device. The device connecting end is slidably mounted to the elongate support of the rotation limiting device.

In some embodiments, the plurality of biasing members includes: at least one front biasing member disposed forward of the device connecting end of the connection bracket, the at least one front biasing member resisting rotation of the track assembly about the drive wheel axis in a first direction; and at least one rear biasing member disposed rearward of the device connecting end of the connection bracket, the at least one rear biasing member resisting rotation of the track assembly about the drive wheel axis in a second direction opposite the first direction.

In some embodiments, the rotation limiting device also includes a suspension arm attachment for connecting the rotation limiting device to the suspension arm of the vehicle. The suspension arm attachment is disposed forward of the connection bracket.

In some embodiments, the elongate support of the rotation limiting device has a front end and a rear end. The at least one front biasing member is disposed between the device connecting end of the connection bracket and the front end of the elongate support. The at least one rear biasing member is disposed between the device connecting end of the connection bracket and the rear end of the elongate support.

In some embodiments, the elongate support comprises a rod end defining the front end of the elongate support. The rod end is connected to the suspension arm attachment.

In some embodiments, each of the at least one front biasing member and the at least one rear biasing member includes: a first biasing member having a first biasing rate and a second biasing member having a second biasing rate. The first biasing rate being greater than the second biasing rate.

In some embodiments, the track assembly is a rear track assembly.

According to another aspect of the present technology, there is provided a vehicle. The vehicle includes: a vehicle frame; a motor supported by the vehicle frame; and a suspension assembly including a suspension arm pivotally connected to the vehicle frame and a shock absorber connected between the suspension arm and the vehicle frame. The vehicle also includes a track assembly connected to the suspension arm. The track assembly includes a track assembly frame, a plurality of track-contacting wheels, and an endless track disposed around the track-contacting wheels. The track-contacting wheels include a drive wheel rotationally connected to the track assembly frame and at least one idler wheel rotationally connected to the track assembly frame. The drive wheel defines a drive wheel axis about which the drive wheel is rotatable. The drive wheel is operatively connected to the motor and is adapted for driving the endless track. The track assembly also includes a rotation limiting device for limiting rotation of the track assembly relative to the suspension arm. The rotation limiting device is connected between the track assembly frame and the suspension arm.

In some embodiments, the vehicle also includes a differential operatively connected to the motor. The suspension arm is connected to the differential such that the differential moves together with the suspension arm relative to the vehicle frame.

In some embodiments, the vehicle also includes a half shaft operatively connecting the differential to the drive wheel of the track assembly. The half shaft at least partially extends within the suspension arm.

In some embodiments, the track has an outer lateral edge and an inner lateral edge and the rotation limiting device is entirely disposed laterally between the outer and inner lateral edges of the track.

In some embodiments, the rotation limiting device is entirely disposed laterally between the drive wheel and the inner lateral edge of the track.

In some embodiments, the rotation limiting device includes an elongate support and a plurality of biasing members supported by the elongate support.

In some embodiments, the elongate support is disposed vertically lower than the drive wheel axis.

In some embodiments, the rotation limiting device also includes a suspension arm attachment connecting the rotation limiting device to the suspension arm. The suspension arm attachment remains attached to the suspension arm when the track assembly is uninstalled from the vehicle.

In some embodiments, the track assembly is replaceable by a ground-engaging wheel. The ground-engaging wheel has a rim defining a partially enclosed space. When the track assembly is replaced by the ground-engaging wheel, the suspension arm attachment is at least partially contained within the enclosed space defined by the rim of the ground-engaging wheel.

In some embodiments, the suspension arm attachment locks the rotation limiting device to the suspension arm to prevent the suspension arm attachment from rotating relative to the suspension arm.

In some embodiments, the track assembly also includes a fastener that extends laterally and engages the suspension arm attachment and a portion of the suspension arm to lock the rotation limiting device to the suspension arm.

In some embodiments, a bracket is fixedly connected to the portion of the suspension arm. The fastener engages the suspension arm attachment and the bracket to lock the rotation limiting device to the suspension arm. A lower end of the shock absorber is connected to the bracket.

In some embodiments, the suspension arm attachment includes a clamp configured to at least partially surround a portion of the suspension arm.

In some embodiments, the suspension arm attachment has an upper portion and a lower portion. The lower portion of the suspension arm attachment is connected to the elongate support. The upper portion of the suspension arm attachment is connected to the suspension arm.

In some embodiments, the vehicle also includes a connection bracket for connecting the rotation limiting device to the track assembly frame. The connection bracket has a frame connecting end connected to the track assembly frame and a device connecting end connected to the rotation limiting device. The device connecting end is slidably mounted to the elongate support of the rotation limiting device.

In some embodiments, the plurality of biasing members includes: at least one front biasing member disposed forward of the device connecting end of the connection bracket, the at least one front biasing member resisting rotation of the track assembly about the drive wheel axis in a first direction; and at least one rear biasing member disposed rearward of the device connecting end of the connection bracket, the at least one rear biasing member resisting rotation of the track assembly about the drive wheel axis in a second direction opposite the first direction.

In some embodiments, the rotation limiting device also includes a suspension arm attachment connecting the rotation limiting device to the suspension arm. The suspension arm attachment is disposed forward of the connection bracket.

In some embodiments, the elongate support of the rotation limiting device has a front end and a rear end. The at least one front biasing member is disposed between the device connecting end of the connection bracket and the front end of the elongate support. The at least one rear biasing member is disposed between the device connecting end of the connection bracket and the rear end of the elongate support.

In some embodiments, the elongate support includes a rod end defining the front end of the elongate support. The rod end is connected to the suspension arm attachment.

In some embodiments, each of the at least one front biasing member and the at least one rear biasing member includes: a first biasing member having a first biasing rate and a second biasing member having a second biasing rate. The first biasing rate is greater than the second biasing rate.

In some embodiments, the vehicle is an all-terrain vehicle (ATV).

In some embodiments, the suspension assembly is a rear suspension assembly and the track assembly is a rear track assembly.

According to another aspect of the present technology, there is provided a track assembly for a vehicle. The vehicle has a suspension arm for connecting the track assembly to the vehicle. The track assembly includes a frame, a plurality of track-contacting wheels and an endless track disposed around the track-contacting wheels. The track-contacting wheels include a drive wheel rotationally connected to the frame and at least one idler wheel rotationally connected to the frame. The drive wheel defines a drive wheel axis about which the drive wheel is rotatable. The drive wheel is adapted for driving the endless track. The track has an outer lateral edge and an inner lateral edge. The track assembly also includes a rotation limiting device for limiting rotation of the track assembly relative to the suspension arm of the vehicle. The rotation limiting device is connected to the frame of the track assembly. A portion of the rotation limiting device is configured to be pivotally connected to the suspension arm of the vehicle about a pivot connection axis. The pivot connection axis is disposed vertically lower than the drive wheel axis everywhere between the inner lateral edge of the track and the innermost portion of the drive wheel.

In some embodiments, the pivot connection axis extends parallel to the drive wheel axis.

In some embodiments, the rotation limiting device also includes a suspension arm attachment. The portion of the rotation limiting device is configured to be pivotally connected to the suspension arm via the suspension arm attachment. The suspension arm attachment is configured to lock the rotation limiting device to the suspension arm of the vehicle to prevent the suspension arm attachment from rotating relative to the suspension arm of the vehicle.

For purposes of the present application, terms related to spatial orientation when referring to a vehicle and components in relation to the vehicle, such as "forwardly", "rearwardly", "left", "right", "above" and "below", are as they would be understood by a driver of the vehicle sitting thereon in an upright driving position, with the vehicle steered straight-ahead.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 9;

DETAILED DESCRIPTION

The present technology will be described with reference to a four-wheeled straddle-seat all-terrain vehicle (ATV) 10. However, it is contemplated that aspects of the present technology could be used in other types of off-road vehicles, such as side-by-side vehicles, dune buggies, and the like.

Figure 1:
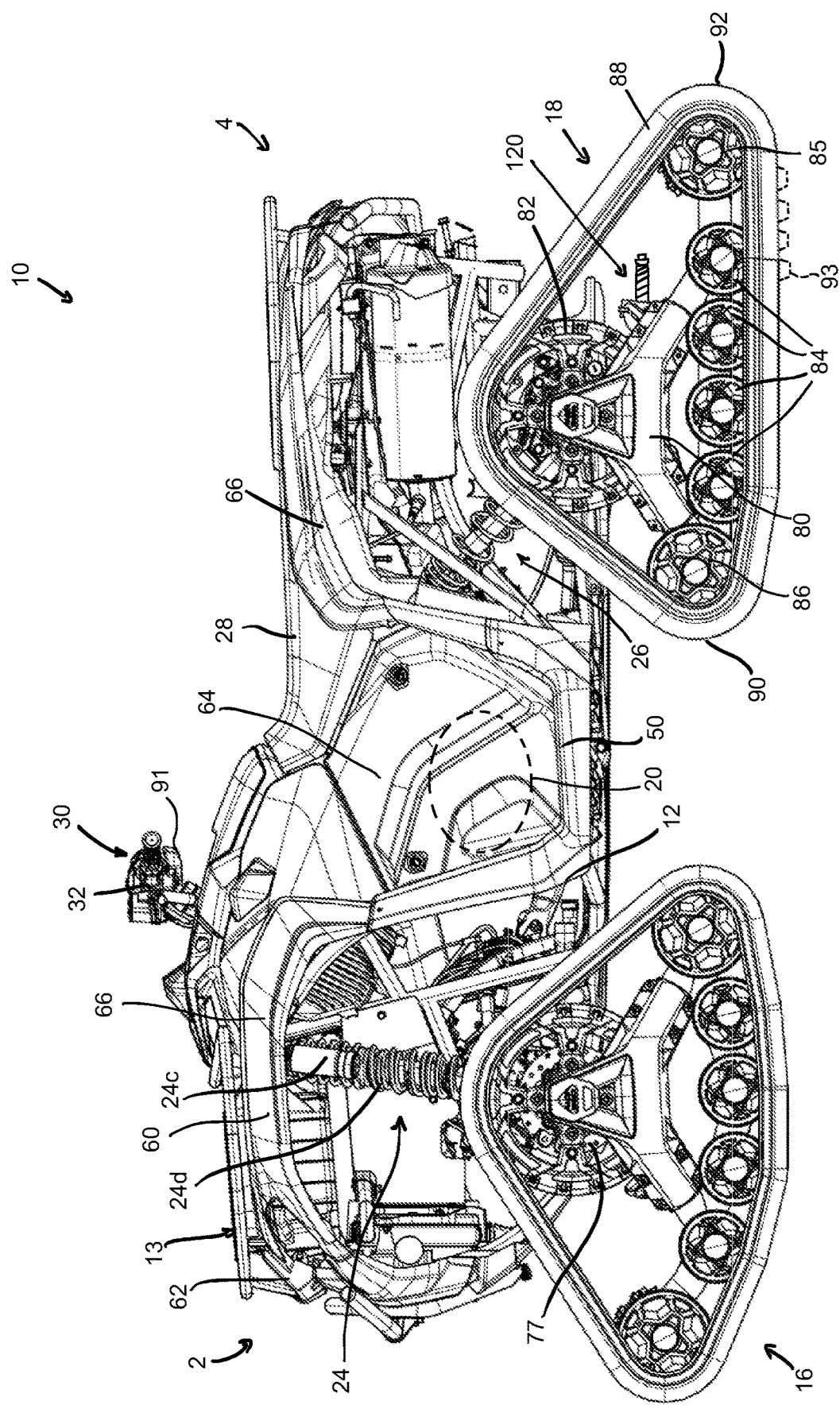
FIG. 1 is a left side elevation view of an all-terrain vehicle (ATV) provided with track assemblies.
Figure 4:
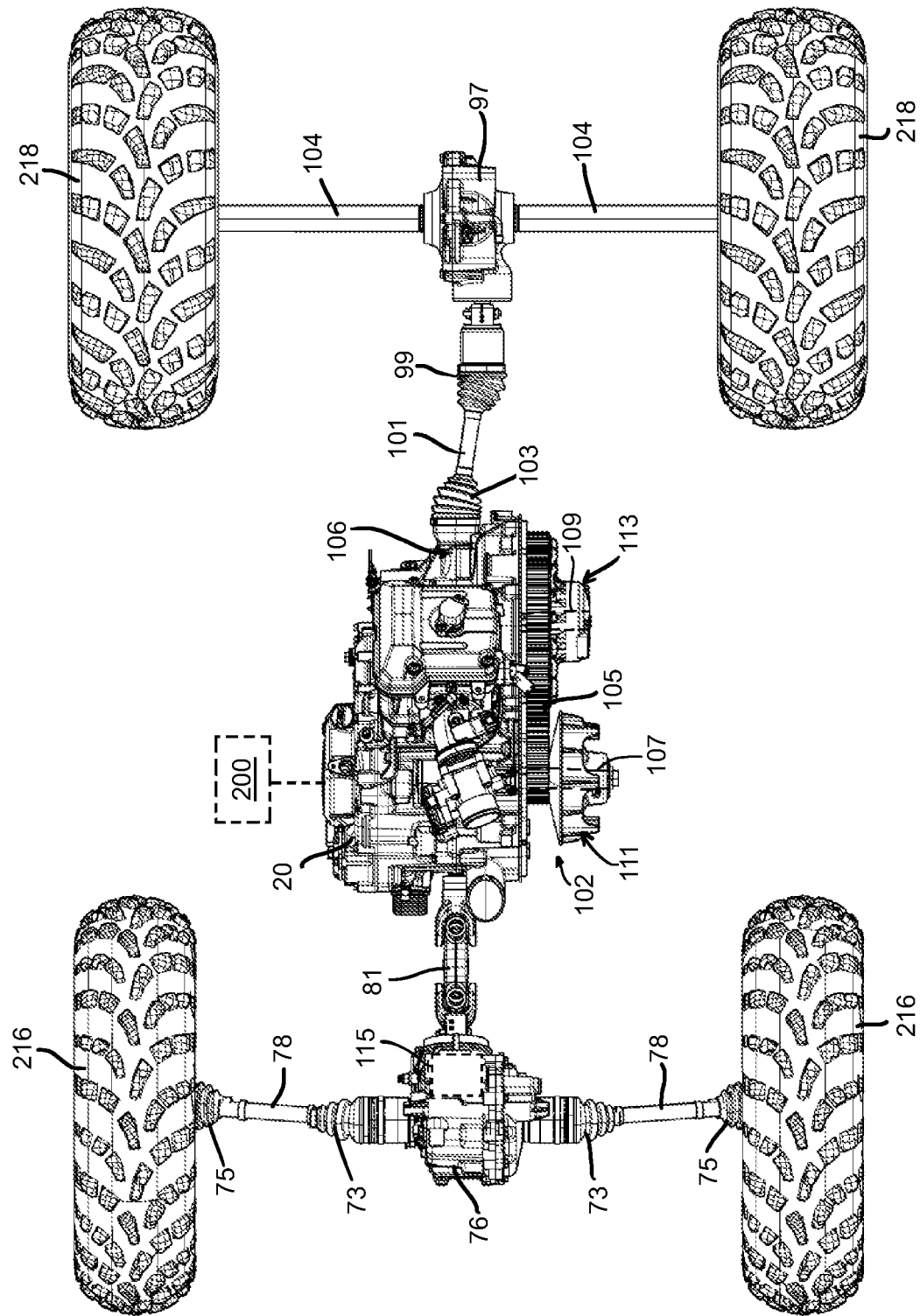
FIG. 4 is a top plan view of part of a powertrain of the vehicle of FIG. 1, with the vehicle provided with ground-engaging wheels.
Figure 5:
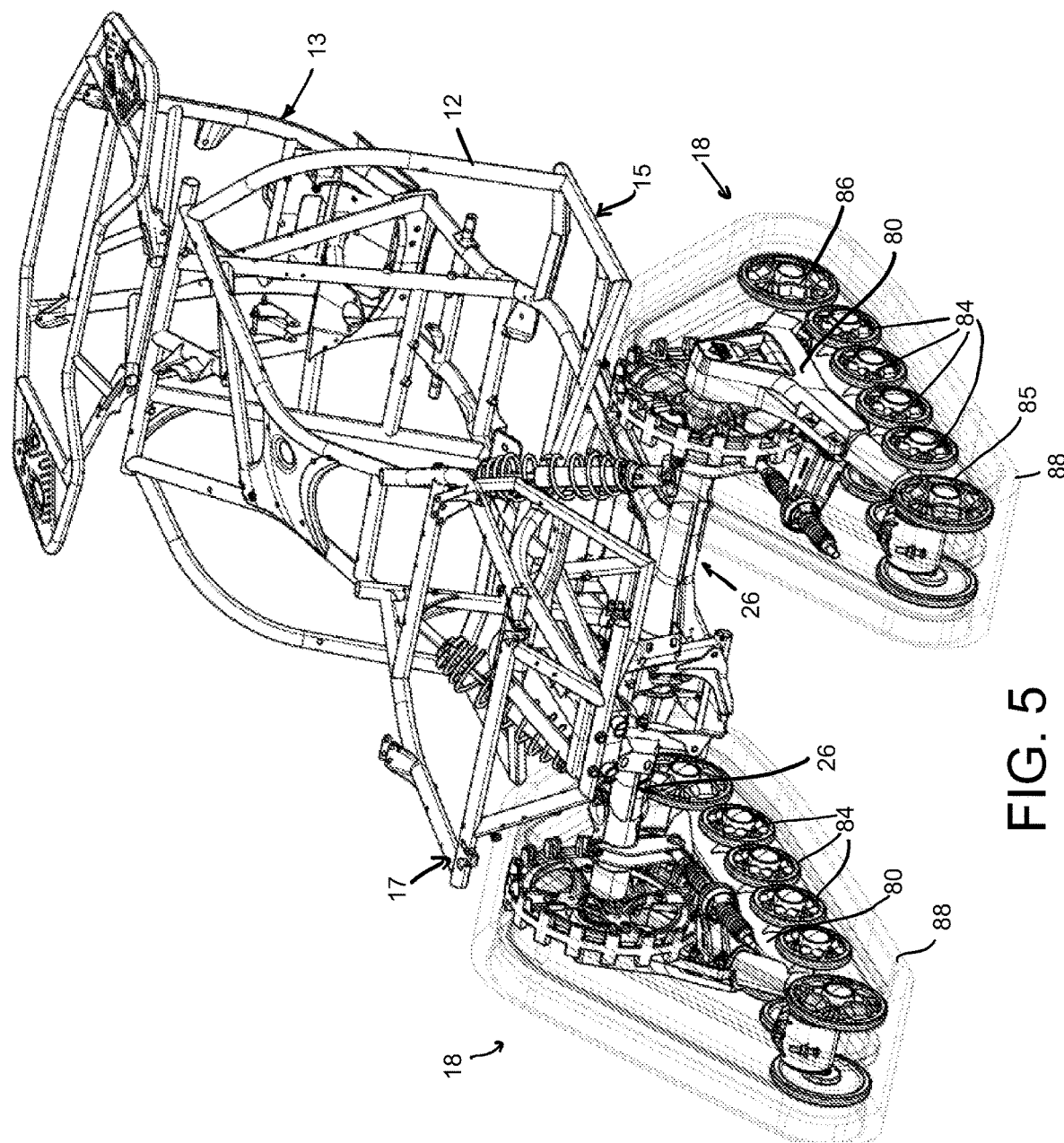
FIG. 5 is a perspective view, taken from a rear right side, of the frame, rear suspension assemblies and rear track assemblies of the vehicle of FIG. 1, with the endless tracks of the rear track assemblies shown in transparency.

With reference to FIG. 1, the ATV 10 has a front end 2 and a rear end defined consistently with a forward travel direction of the ATV 10. The ATV 10 has a frame 12 to which a vehicle body is mounted. The frame 12 has a front portion 13, a middle portion 15 and a rear portion 17. A pair of front track assemblies 16 is suspended from the front portion 13 of the frame 12 via front suspension assemblies 24. A pair of rear track assemblies 18 is suspended from the middle portion 15 of the frame 12 via rear suspension assemblies 26. As will be discussed in greater detail below, the front and rear track assemblies 16, 18 are interchangeably replaceable by front and rear ground-engaging wheels 216, 218 (as shown in FIG. 4) including tires adapted for off-road conditions and traversing rugged terrain. As such, a user can choose to install the track assemblies 16, 18 or the ground-engaging wheels 216, 218 on the ATV 10 depending on terrain conditions.

As illustrated in FIG. 1, the ATV 10 also includes fairings 60 including a front fascia 62 at the front end 2 of the ATV 10 and several side panels 64 extending over lateral sides of the ATV 10. A fender 66 is disposed over each wheel well overarching the track assemblies 16, 18 to protect the driver and/or passenger from dirt, water and other debris being projected by the track assemblies 16, 18 (or the ground-engaging wheels 216, 218). The ATV 10 further includes a straddle-type driver seat 28 mounted to the frame 12 for accommodating a driver of the ATV 10. Driver footrests are provided on either side of the driver seat 28 and are disposed vertically lower than the driver seat 28 to support the driver's feet. Another straddle-type passenger seat may be provided behind the driver seat 28 to accommodate a passenger.

Figure 2:
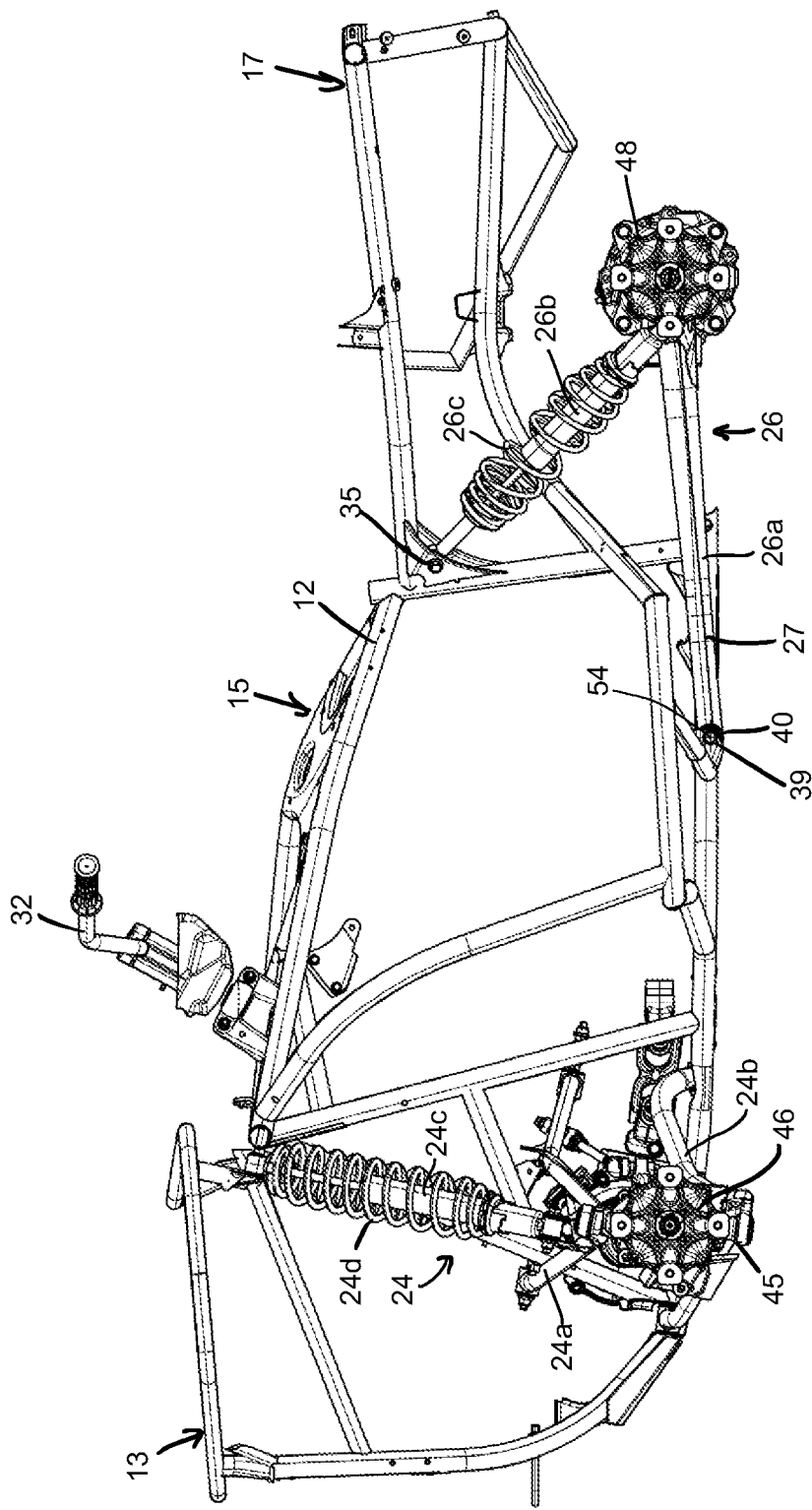
FIG. 2 is a left side elevation view of a frame, suspension assemblies and certain steering components of the vehicle of FIG. 1.
Figure 3:
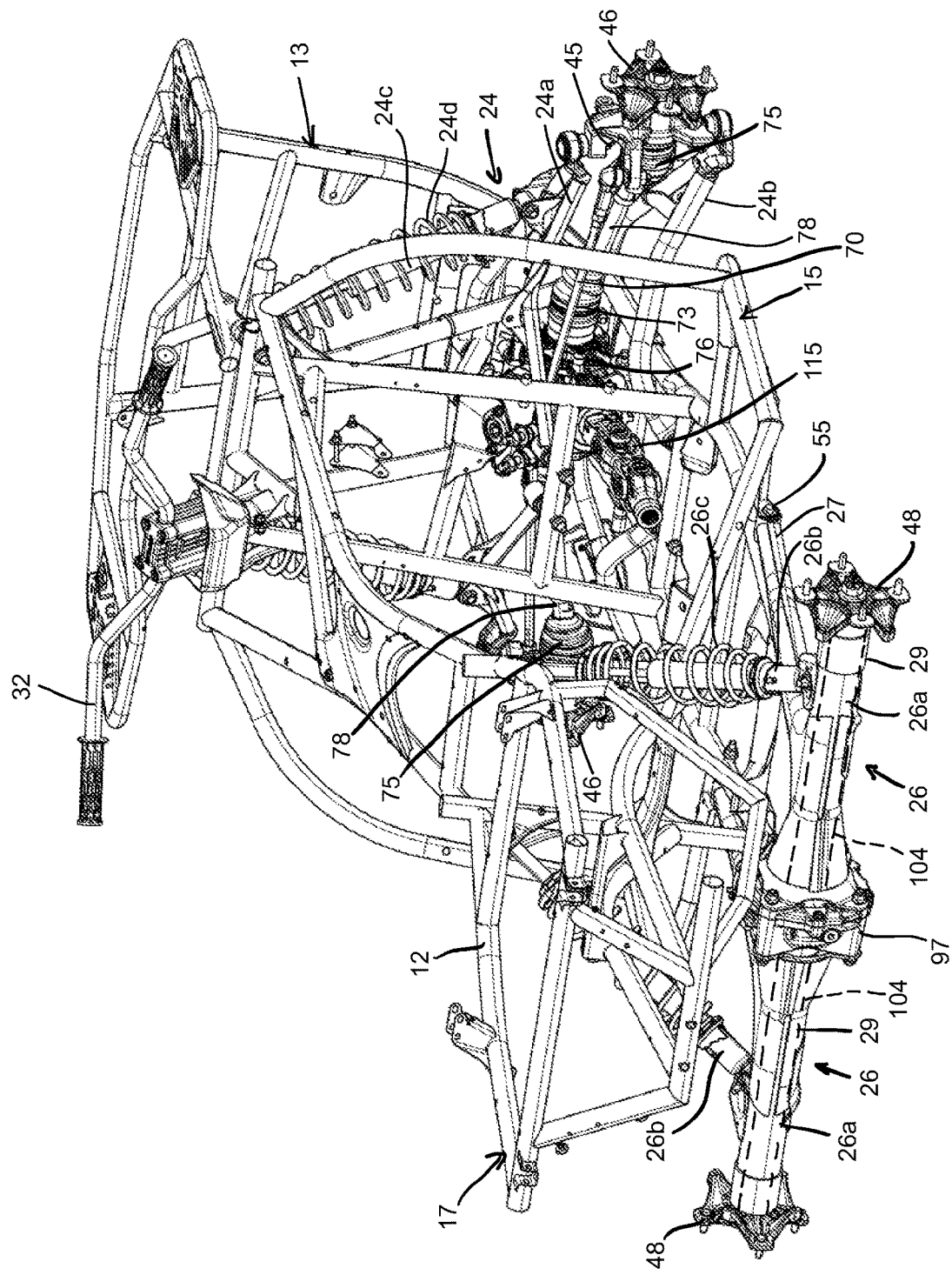
FIG. 3 is a perspective view, taken from a rear right side, of the components of FIG. 2.

As shown in FIGS. 2 and 3 each front suspension assembly 24 includes an upper A-arm 24a, a lower A-arm 24b, a front shock absorber 24c and a front coil spring 24d. The front coil spring 24d is mounted over the front shock absorber 24c. The front coil spring 24d and the front shock absorber 24c are both pivotably connected at their lower ends to the upper A-arm 24a and at their upper ends to the frame 12. The upper and lower A-arms 24a, 24b each have one end pivotably connected to the frame while a steering knuckle 45 (FIG. 3) is mounted to the opposite ends of the upper and lower A-arms 24a and 24b. A drive hub assembly 46 is mounted to the steering knuckle for connecting a corresponding one of the front track assemblies 16 or the front ground-engaging wheels 216 thereto.

Figure 6:
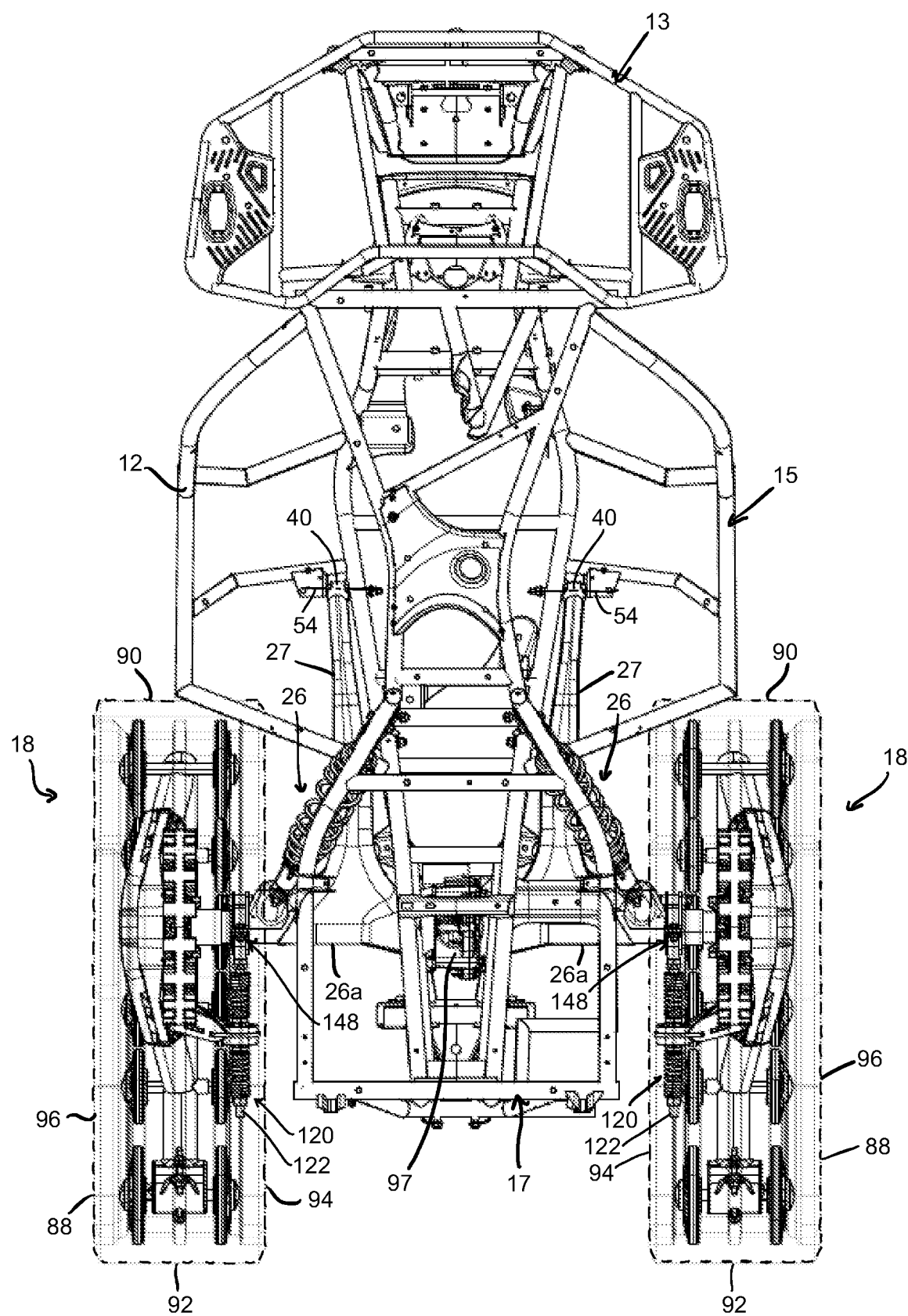
FIG. 6 is a top plan view of the components of FIG. 5.
Figure 10:
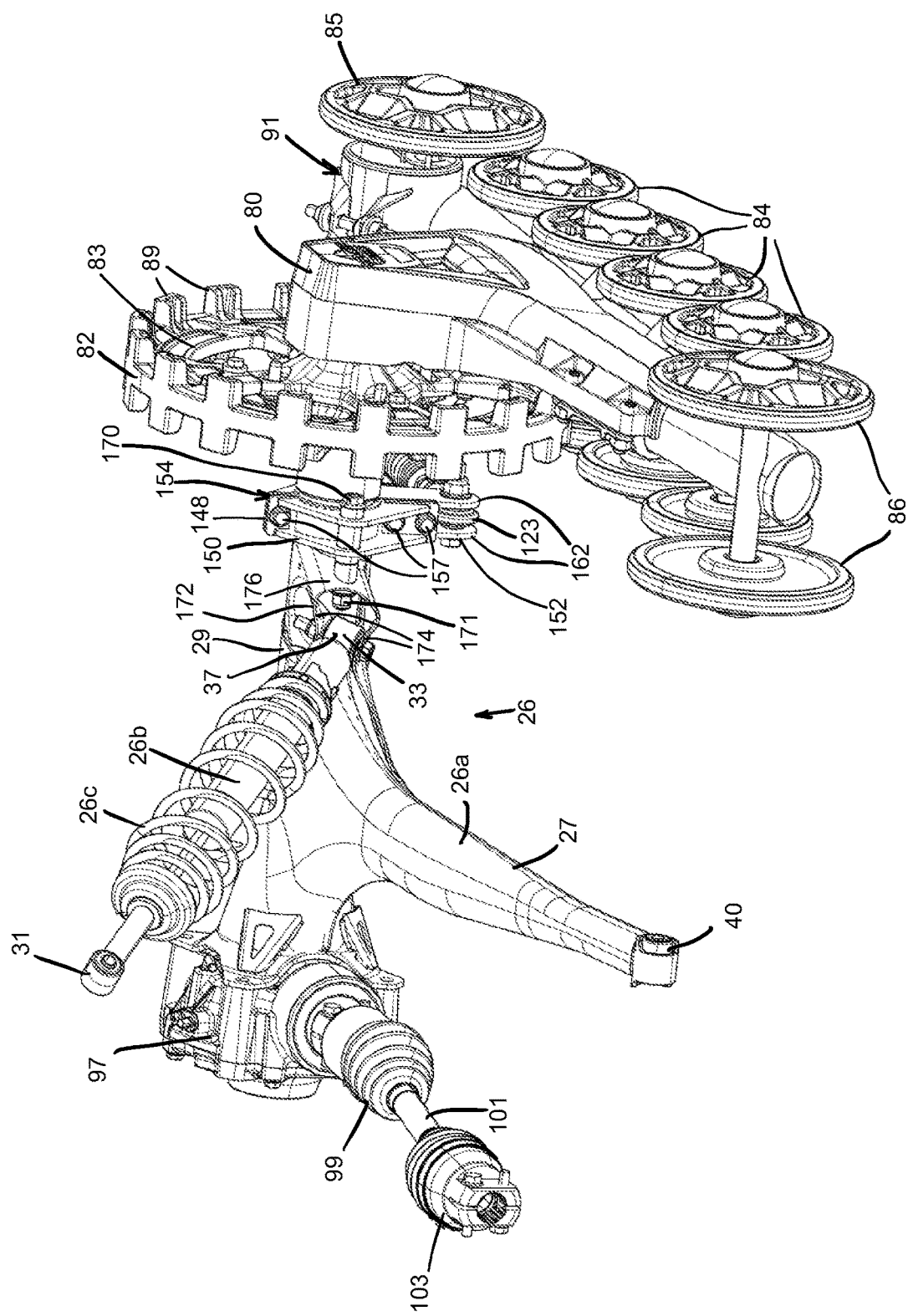
FIG. 10 is a perspective view, taken from a front left side, of the components of FIG. 9 with a shock absorber and a coil spring of the left suspension assembly shown.

As shown in FIGS. 2, 3, 6 and 7, each rear suspension assembly 26 comprises a suspension arm 26a, a rear shock absorber 26b and a rear coil spring 26c. The rear coil spring 26c is mounted over the rear shock absorber 26b. For each rear suspension assembly 26, the rear shock absorber 26b has an upper end 31 pivotally connected to the frame 12 at a pivot 35 (FIG. 2) and a lower end 33 pivotally connected to the suspension arm 26a at a pivot 37 (FIG. 10). Each suspension arm 26a has a longitudinally-extending portion 27 and a laterally-extending portion 29. A front end 40 of the longitudinally-extending portion 27 of the suspension arm 26a is pivotably connected to the middle portion 15 of the frame 12 about a pivot axis 54 extending generally laterally. Notably, as shown in FIGS. 3 and 6, a fastener 55 extends through the front end 40 of the longitudinally-extending portion 27 and through a flange of the frame 12. A pivot 39, formed between the front end 40 and the frame 12 and defining the pivot axis 54, is vertically lower than the pivot 35.

The laterally-extending portion 29 of the suspension arm 26a is connected to a rear end of the longitudinally-extending portion 27. The laterally-extending portion 29 is connected to a rear differential 97 (which will be described in greater detail below) such that the rear differential 97 moves together with the suspension arm 26a relative to the frame 12. As shown in FIG. 3, the laterally-extending portion 29 also encloses a half shaft 104 that is operatively connected between the corresponding rear track assembly 18 and the rear differential 97. Notably, a rear drive hub assembly 48 is operatively connected to the half shaft 104 and rotates therewith.

A steering assembly 30 is rotationally supported by the frame 12 to enable a driver to steer the ATV 10. The steering assembly 30 includes a handlebar assembly including a handlebar 32 connected to a steering column (not shown) for actuating steering linkages 70 operably connected to the left and right front track assemblies 16. In this embodiment, the steering assembly 30 includes a power steering electric motor mounted to the steering column for facilitating steering. The power steering electric motor is operatively connected to the steering column and to the left and right front track assemblies 16 via the steering linkages 70.

As shown in FIG. 1, a throttle operator 91 in the form of a thumb-actuated throttle lever is provided near the right end of the handlebar 32. Other types of throttle operators, such as a finger-actuated throttle lever and a twist grip, are also contemplated. The throttle operator 91 is selectively actuated by the driver of the ATV to request throttle from the engine. More specifically, a throttle operator position sensor (not shown) is operatively connected to the throttle operator 91 to sense movement thereof caused by the driver in operation. The sensed input from the throttle operator position sensor is transmitted to an electronic control unit (ECU) 200, shown in FIG. 4, which controls operation of the ATV's motor 20.

A motor 20 (schematically shown in FIG. 1) is mounted to the middle portion of the frame 12 and, as will be described in greater detail below, is operatively connected to the front and rear track assemblies 16, 18 in order to propel the ATV 10. In this embodiment, the motor 20 is an internal combustion engine, and in particular a V-type engine having two cylinders. The cylinders are disposed at an angle to each other. Each cylinder has an intake port (not shown) connected to an air induction system delivering air into the engine 20. Each cylinder has a fuel injector injecting fuel into the engine 20 and a spark plug igniting the fuel-air mixture to initiate the combustion cycle. Each cylinder has an exhaust port connected to an exhaust manifold through which the exhaust gases are removed from the engine 20. It is contemplated that other types of internal combustion engine could be used, such as, for example, an inline engine. It is also contemplated that the engine 20 could have more than two cylinders.

The engine air induction system feeds air to the engine 20 in a known manner and will thus not be described in detail here. Notably, a throttle valve is controlled by the ECU 200 to adjust the air being fed to the engine 20 in response to input by the driver at the throttle operator 91.

It is contemplated that the engine 20 could instead be a different type of motor in other embodiments. For example, in some embodiments, the engine 20 could instead be an electric motor, in which case the engine air induction or air exhaust systems may be omitted.

With reference to FIG. 4, which illustrates part of a powertrain of the ATV 10, the powertrain of the ATV 10 includes the engine 20, a continuously variably transmission (CVT) 102 and a transmission 106. An output shaft 107 (shown in dashed lines in FIG. 4) of the engine 20 is connected to the CVT 102 which, as will be described in greater detail below, is in turn connected to the transmission 106.

A gear selector handle (not shown) is configured to be selectively moved between positions P, N, R, L, H (respectively corresponding to a parking, neutral, reverse, low and high gears) and allows the driver of the ATV 10 to make a gear selection. It is contemplated that the sequence of gears could be different. The gear selector handle is connected to the transmission 106 for effecting the gear selection. The transmission 106 is disposed rearward of the engine 20. The transmission 106 transfers torque from the transversely extending driven shaft 109 to the longitudinally extending front and rear driveshaft (not shown). The transmission 106 includes different gear sets, the combination of the gear sets being selected based on the position of the gear selector.

As shown in FIG. 4, the CVT 102 is disposed on a left side of the engine 20. The CVT 102 includes a drive pulley 111 disposed on the output shaft 107 of the engine 20, a driven pulley 113 disposed on a driven shaft 109 (shown in dashed lines in FIG. 4) for rotation therewith, and a CVT belt 105 disposed around both pulleys 111, 113 to transmit torque from the drive pulley 111 to the driven pulley 113. A cover (not shown) disposed over the CVT 102 is connected to both the engine 20 and the transmission 106. The driven shaft 109 is connected to the transmission 106 for transmitting thereto the torque output of the engine 20.

Each of the pulleys 111, 113 includes a movable sheave that can move axially relative to a fixed sheave to modify an effective diameter of the corresponding pulley 111, 113. The drive pulley 111 is a centrifugal pulley in that the sheaves thereof move in response to a centrifugal force applied thereon caused by changes in engine speed and torque requirement of the wheels 16, 18. The effective diameters of the pulleys 111, 113 are in inverse relationship. In the illustrated embodiment, the CVT is a purely mechanical CVT 102, in which the diameter of the drive pulley 111 increases with increasing rotational speed of the drive pulley 111 (i.e. with increasing engine speed). The diameter of the driven pulley 113 therefore decreases when the torque required at the driven shaft 109 (connected to the wheels 16, 18) increases. The CVT 102 may thus be referred to as an "unassisted" CVT in that a gear ratio of the CVT (i.e., an effective diameter of the driven pulley 113 over the effective diameter of the drive pulley 111) is automatically mechanically adjusted in accordance with the speed of the engine 20 and the torque requirement of the wheels 16, 18. It is contemplated that a different type of CVT could be provided. It is also contemplated that the CVT 102 and the transmission 106 could be replaced by different transmission components.

In this embodiment, the front and rear track assemblies 16, 18 are operatively connected to the engine 20 to propel the ATV 10 on the ground. More specifically, as shown in FIG. 4, the ATV 10 has a front differential 76 adapted to receive, via a driveshaft 81 a torque from the engine 20. With reference to FIGS. 3 and 4, on each of its left and right sides, the front differential 76 is connected to a constant velocity (CV) joint 73 connected to one end of a respective half shaft 78. Another CV joint 75 is connected to an opposed end of each half shaft. As shown in FIG. 3, each half shaft 78 is operatively connected to a corresponding steering knuckle by a drive wheel shaft (not shown) that is connected to a corresponding one of the CV joints 75. A front disc 77 (FIG. 1) is mounted to each hub assembly 46 which is connected to its corresponding drive wheel shaft. On each side of the front differential 76, the front track assembly 16, the disc 77, the CV joint 73, the half shaft 78 and the CV joint 75 are operably connected to rotate together, at a common speed. The torque from the engine 20 is received at the driveshaft 81 (which may be referred to as an "input" shaft of the front differential 76) when the ATV 10 is in the four-wheel drive mode. In turn, the front differential 76 transmits the torque to the front track assemblies (or the front wheels 216) via the CV joints 73, the front half shafts 78, the CV joints and the drive wheel shafts.

Depending on riding conditions, the front differential 76 may send unequal torque to the two front track assemblies 16 (or the front wheels 216) so that the left front track assembly 16 and the right front track assembly 16 may rotate at different speeds.

Left and right front brake assemblies include the discs 77 and further include calipers mounted on the steering knuckles 45. The calipers include brake pads and are operable to cause the brake pads to apply pressure on the respective discs 77.

Figure 9:
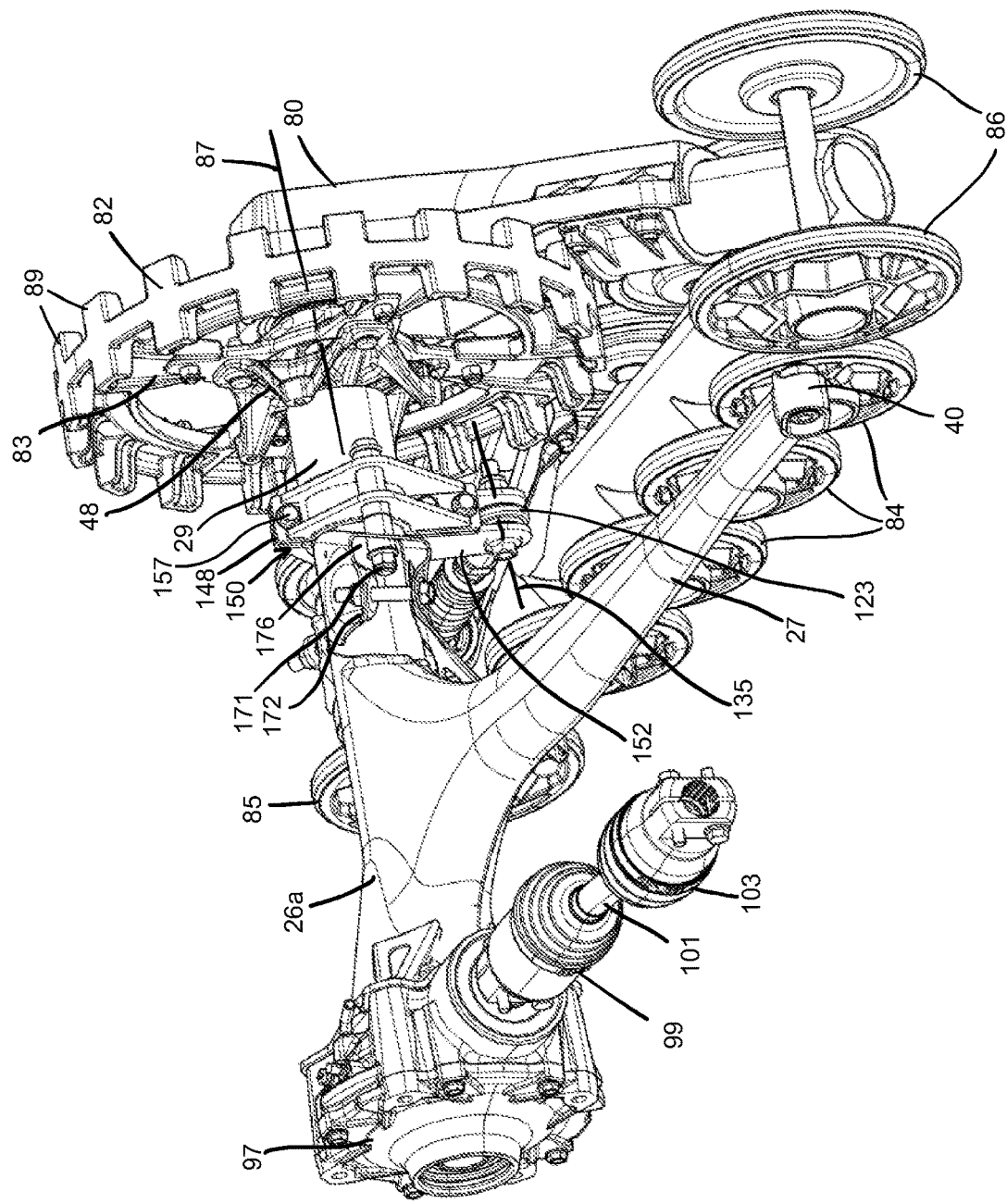
FIG. 9 is a perspective view, taken from a front right side, of a rear differential, part of the left rear suspension assembly, and part of the left rear track assembly of the vehicle of FIG. 1.

As shown in FIGS. 3 and 4, the ATV 10 includes a rear differential 97. An input shaft 100 (FIG. 7) of the rear differential 97 is operably connected to a shaft by a universal joint 99 (FIGS. 4 and 9). The shaft 101 is connected by a universal joint 103 (FIGS. 4 and 9) to the transmission 106 to receive an input torque from the engine 20. As shown in FIG. 4, on each of its left and right sides, the rear differential is operatively connected to a respective half shaft 104. Each half shaft 104 is connected at a distal end to one of the rear drive hub assemblies 48. As shown in FIG. 3, each half shaft 104 extends within the laterally-extending portion 29 of one of the suspension arms 26a.

The ATV 10 can be operated in a rear-wheel drive mode (i.e., a two-wheel drive mode) in which the rear track assemblies 18 (or rear wheels 218) are driven by the engine 20 or in a four-wheel drive mode in which the front and rear track assemblies 16, 18 (or front and rear wheels 216, 218) are driven by the engine 20. To that end, in this embodiment, the transmission 106 is selectively connected to the front track assemblies 16 via a drive mode coupler 115, shown schematically in FIG. 4. The drive mode coupler 115 is controlled by the user and is selectively actuated to cause the ATV 10 to change from the two-wheel drive mode configuration to the four-wheel drive mode configuration by selectively coupling the front track assemblies 16 (or front wheels 216) to the transmission 106 for selectively driving the front track assemblies 16. Such drive mode couplers are known in the art and will thus not be described in detail herein.

Therefore, when the ATV 10 is in the two-wheel drive mode, a torque output of the engine 20 is applied via the CVT 102 and the transmission 106 to the left and right rear track assemblies 18 (or left and right rear wheels 218). Conversely, when the ATV 10 is in the four-wheel drive mode, a portion of the torque output of the engine is applied to each of the front track assemblies 16 and rear track assemblies 18 (or front and rear wheels 216, 218) via the CVT 102 and the transmission 106.

The selection between the drive modes is made by the driver using a drive mode switch provided in the vicinity of the driver of the ATV 10. In this embodiment, the drive mode switch is a toggle switch mounted on a dashboard of the ATV 10.

It is contemplated that, in some embodiments, only the front drive hub assemblies 46 or only the rear drive hub assemblies 48 may be operatively connected to the engine 20 such that only the front track assemblies 16 or only the rear track assemblies 18 (alternatively, only the front wheels 216 or only the rear wheels 218) are driven by the engine 20.

It is contemplated that the ATV 10 could be configured differently in other embodiments. The illustrated construction of the ATV 10 is thus not considered to be limiting to the present technology.

The rear track assemblies 18 will be described in more detail below with reference to FIGS. 5 to 10. As the left and right rear track assemblies 18 are mirror images of one another, only the left rear track assembly 18 will be described in detail below. It is understood that the right rear track assembly 18 is configured similarly to the left rear track assembly 18.

Figure 7:
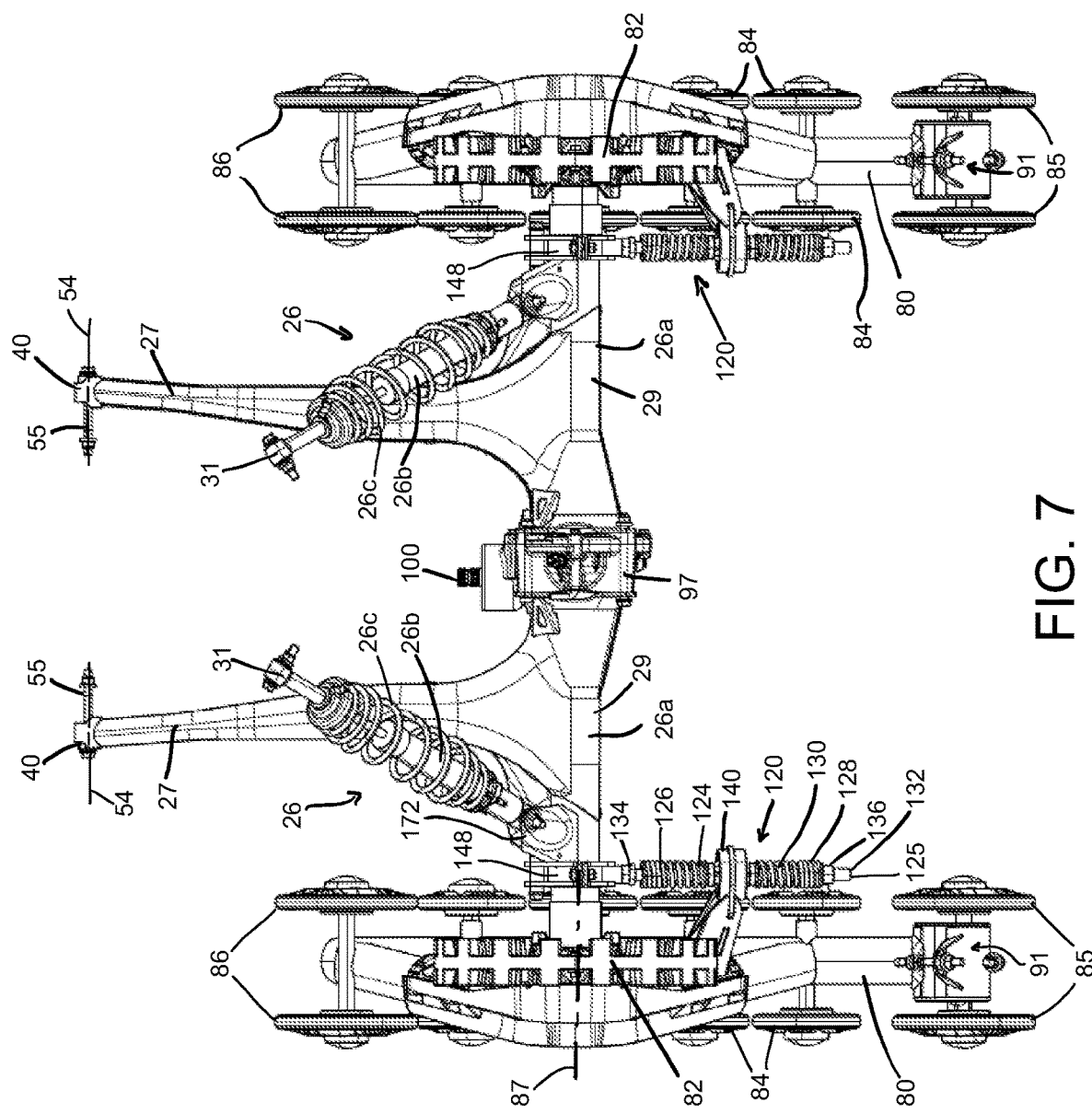
FIG. 7 is a top plan view of the rear suspension assemblies and the rear track assemblies of the vehicle of FIG. 1, with the endless tracks of the rear track assemblies removed.
Figure 8:
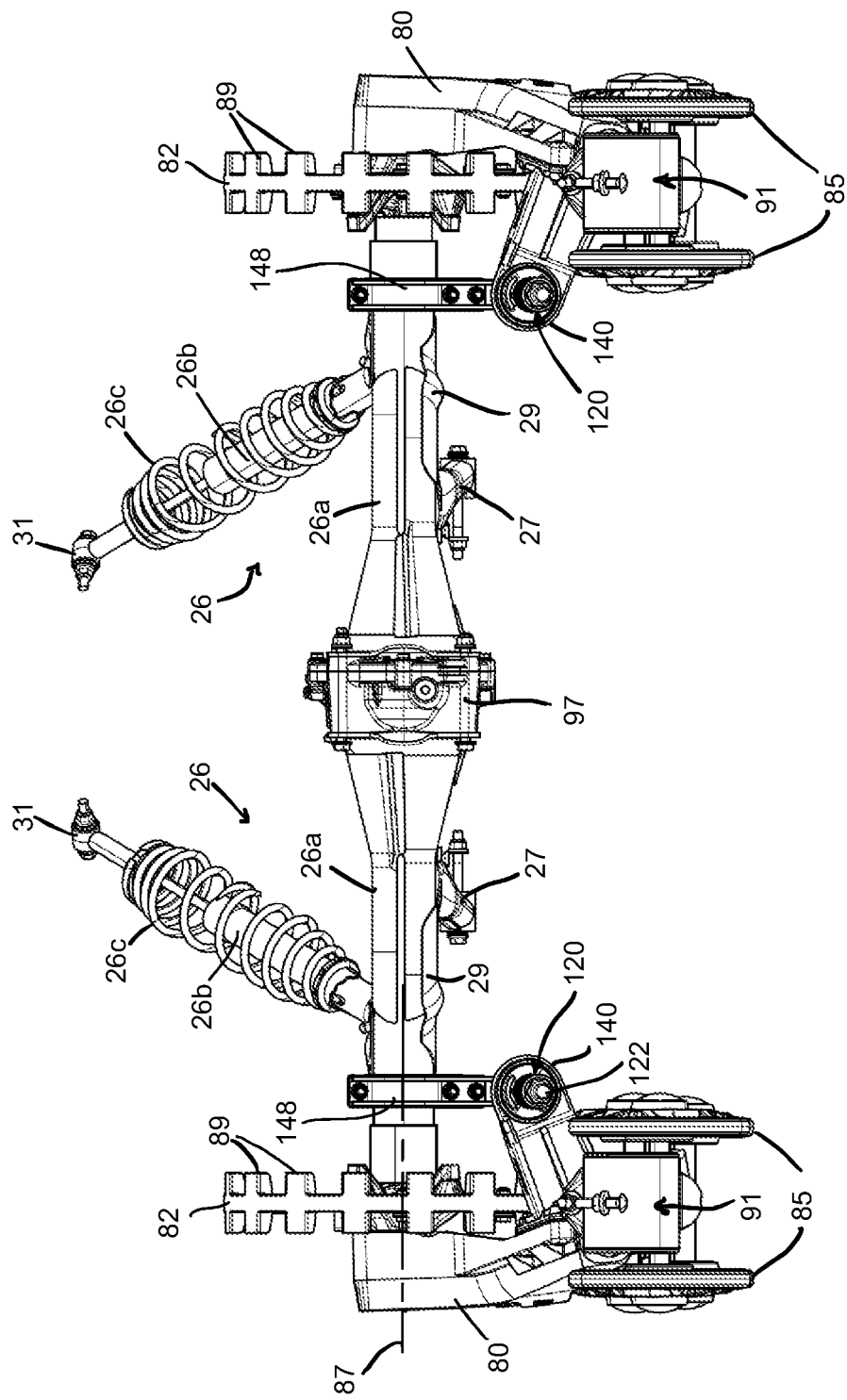
FIG. 8 is a rear elevation view of the components of FIG. 7.

As shown in FIGS. 9 and 10, the rear track assembly 18 has a frame 80 and a plurality of track-contacting wheels including a drive wheel 82, eight middle idler wheels 84, a pair of rear corner idler wheels 85 and a pair of front corner idler wheels 86. The track-contacting wheels 82, 84, 85, 86 are rotationally connected to the frame 80. An endless track 88 is disposed around the track-contacting wheels 82, 84, 85, 86 which define the path over which the track 88 moves. The path of the track 88 is defined in the upper portion by the drive wheel 82, in the rearward and forward portions by the rear and front corner idler wheels 85, 86, and in the bottom portion by the middle idler wheels 84. The track-contacting wheels 82, 84, 85, 86 are positioned so as to keep the track 88 tensioned. In particular, as shown in FIGS. 6 and 7, the track assembly 18 includes a track tensioning device 91 which is operable to adjust the longitudinal position of the rear corner idler wheels 85 such as to modify the tension of the track 88.

In the illustrated embodiment, the idler wheels 84, 85, 86 are arranged in pairs of laterally spaced and longitudinally aligned left and right idler wheels. It is contemplated that at least some of the pairs of idler wheels 84, 85, 86 could be a single wheel centered relative to the track 88. In the illustrated embodiment, the track assembly 18 has four pairs of middle idler wheels 84. It is however contemplated that there could be more or less than four pairs of middle idler wheels 84. It is contemplated that some of the left and right middle idler wheels 84 could not be arranged as pairs of longitudinally aligned wheels.

The corner idler wheels 85, 86 are larger in diameter than the middle idler wheels 56. The large diameter of the corner idler wheels 85, 86 helps to push snow on the ground ahead of the ATV 10 under the ATV 10 and also aids the ATV 10 in moving over obstacles. It is also contemplated that the relative size of the track-contacting wheels 82, 84, 85, 86 could be different than as shown.

The drive wheel 82 has a hub 83 that is mounted to the respective drive hub assembly 48. As such, the corresponding half shaft 104 operatively connects the differential 97 to the drive wheel 82 (via the drive hub assembly 48). The drive wheel is laterally centered with respect to the track 88. The drive wheel 82 drives the track by means of projections 89 extending laterally outwards from its rim and which engage complementary inner lugs (not shown) on the inner surface of the track 88. The drive wheel 82 drives the track 88 over the idler wheels 84, 85, 86 thereby propelling the ATV 10 over the ground. More specifically, the drive wheel 82 defines a drive wheel axis 87 extending laterally about which the drive wheel 82 rotates to cause the track 88 to turn about the track-contacting wheels 82, 84, 85, 86. The drive wheel 82 is rotationally connected to an upper portion of the frame 80 via roller bearings (not shown) so that the drive wheel 82 can rotate about the axis 87 without rotating the frame or any part thereof. The track assembly 18 has limited rotation about the drive wheel axis 87 relative to the suspension arm 26a.

While in this embodiment the drive wheel 82 is a sprocket wheel it is contemplated that other types of drive wheels could be used in other embodiments.

As shown in FIG. 6, the track assembly 18 has a front longitudinal end and a rear longitudinal end 92 which define the length of the track assembly 18. The width of the track assembly 18 is defined by a width of the track 88 measured between an inner lateral edge 94 and an outer lateral edge 96 of the track 88 (the outer lateral edge 96 being the lateral edge facing outwardly away from a center of the ATV 10 while the inner lateral edge 94 faces inwardly towards the center of the ATV 10).

The track 88 has a body including elastomeric material (e.g., rubber) and reinforcements embedded within the elastomeric material. The inner surface of the track 88 has the inner lugs projecting inwardly and which contact at least some of the track-contacting wheels for driving and/or guiding the track 88. More particularly, in this embodiment, the inner lugs of the track 88 are configured to mesh with the projections 89 of the drive wheel 82 as described above. The outer surface of the track has outer ground-engaging lugs 93 (partially shown in dashed lines in FIG. 1) for providing traction on the ground.

It is contemplated that, in other embodiments, the track assembly 18 could be configured differently from that described above. For example, any of the track-contacting wheels and the frame 80 could have any other suitable configuration in other embodiments. Thus, the construction of these components of the track assembly 18 is not considered to be limiting to the present technology.

As will be described with reference to FIGS. 7 to 17, the track assembly 18 has a rotation limiting device 120 for limiting rotation of the track assembly 18 relative to the suspension arm 26a. To that end, and as will be described in greater detail below, the rotation limiting device 120 is connected between the frame of the track assembly 18 and the suspension arm 26a.

As shown in FIG. 6, in this embodiment, the rotation limiting device is contained within a volume defined by the track 88. Notably, the rotation limiting device 120 is entirely disposed laterally between the inner and outer lateral edges 94, of the track 88. More specifically, the rotation limiting device 120 is entirely disposed laterally between the drive wheel 82 and the inner lateral edge 94 of the track 88. As the rotation limiting device 120 is confined to be within the volume defined by the track 88, ground clearance (between the ground and the components of the ATV 10) is not affected thereby. Furthermore, this compact structure of the rotation limiting device 120 can make it cheaper to manufacture than if the rotation limiting device 120 were to be designed to be connected to the frame 12 as in conventional rotation limiting devices.

The rotation limiting device 120 has an elongated support 122 which supports front biasing members 124, 126 and rear biasing members 128, 130. The elongate support 122 includes a stabilizing rod 132 and front and rear stoppers 134, 136. The front and rear biasing members 124, 126, 128, 130 are mounted to the stabilizing rod 132. In particular, in this embodiment, the biasing members 124, 126, 128, 130 are springs which are mounted over the stabilizing rod 132. The front and rear stoppers 134, 136 abut seats 183, 187 (FIG. 13) respectively. The seats 183, 187, which are generally annular and mounted to the stabilizing rod 132, in turn seat the biasing members 126, 130 respectively. The front and rear stoppers 134, 136 may be implemented in any suitable way. For instance, in this embodiment, the front stopper is a rod end which defines a front end 123 of the elongate support 122, while the rear stopper 136 is a fastener (e.g., a nut) disposed proximate to a rear end 125 of the elongate support 122. As can be seen in FIG. 7, the elongate support 122 is disposed vertically lower than the drive wheel axis 87.

Figure 14:
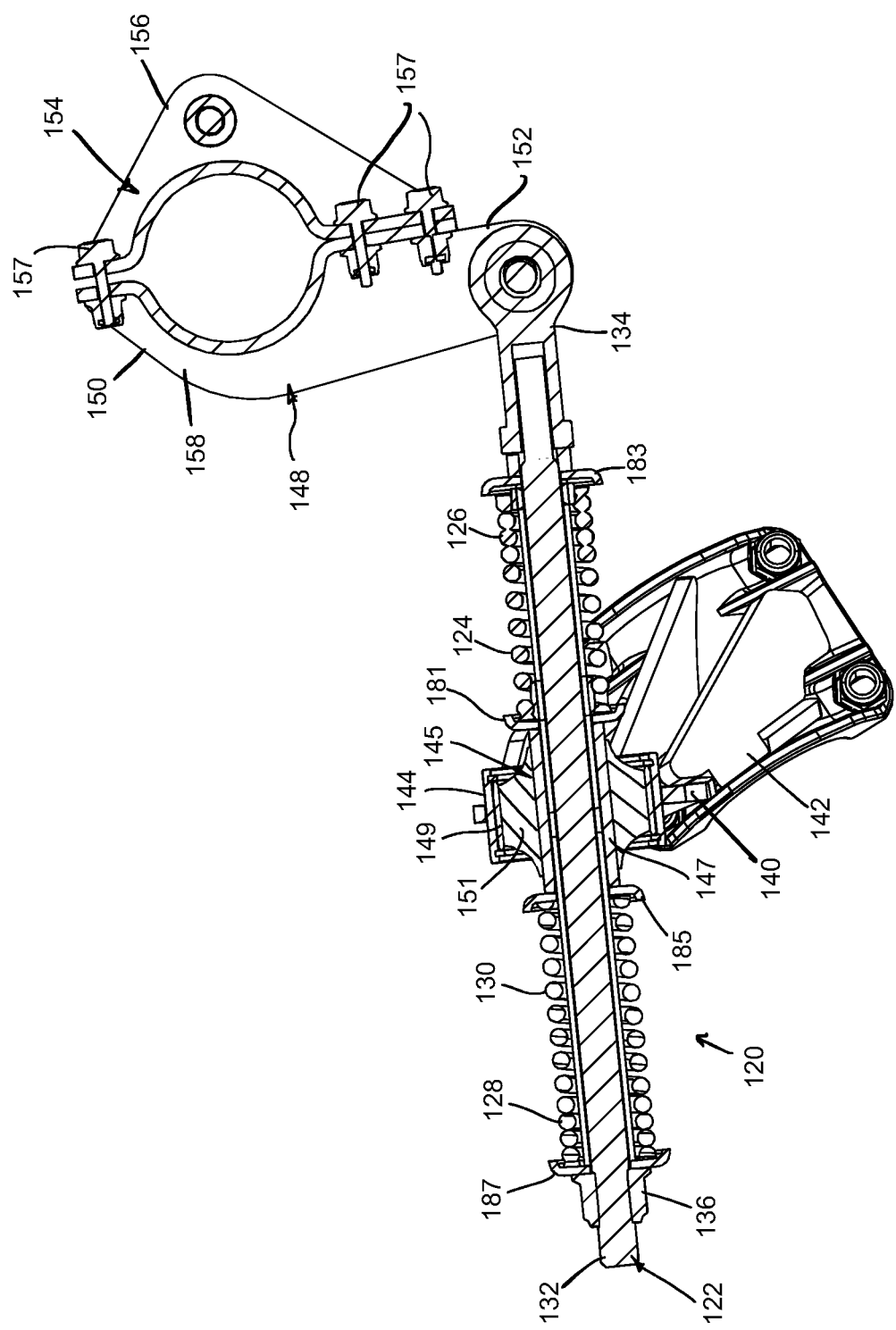
FIG. 14 is a cross-sectional view of the rotation limiting device of FIG. 15 is a cross-sectional view of the rotation limiting device of FIG. 13 in a state in which a bushing assembly of the left rear track assembly is biased.
Figure 15:
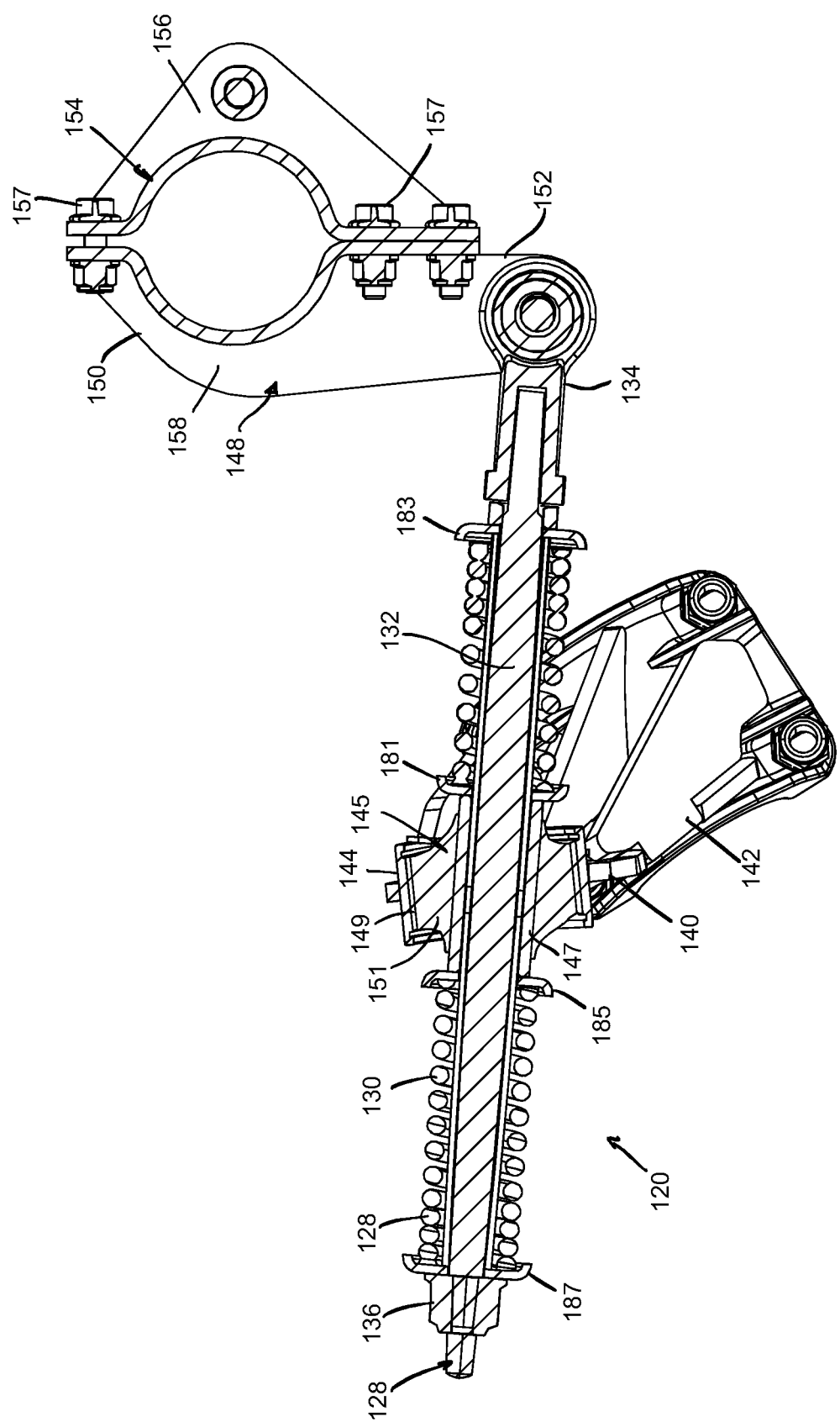

In order to connect the rotation limiting device 120 to the frame 80 of the track assembly 18, the track assembly 18 has a connection bracket 140 which has a frame connecting end 142 and a device connecting end 144. The frame connecting end is connected to the upper portion of the frame 80 while the device connecting end is connected to the rotation limiting device 120. More specifically, the device connecting end 144 is slidably mounted to the elongate support 122 such that the device connecting end 144 is slidably movable along a length of the elongate support 122. In particular, as shown in FIGS. 14 and 15, the rotation limiting device 120 has a bushing assembly 145 that slidably connects the device connecting end 144 of the connection bracket 140 to the elongate support 122. Notably, the bushing assembly 145 is received within a cylindrical opening defined by the device connecting end 144 of the connection bracket 140.

Figure 16:
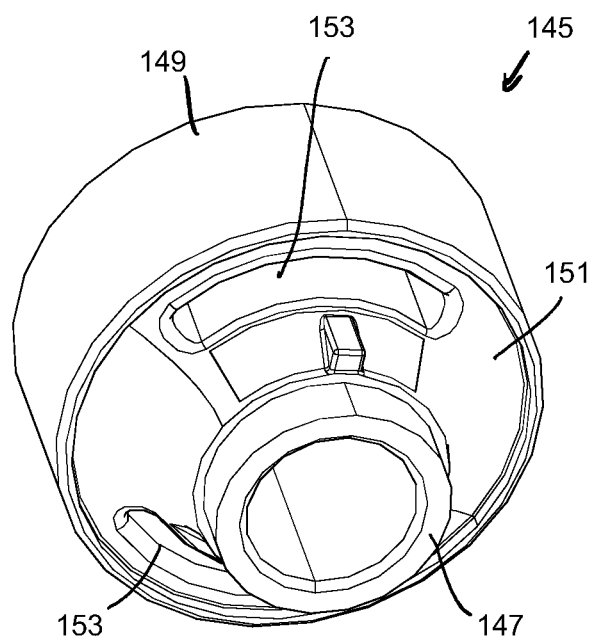
FIG. 16 is a perspective view, taken from a rear, left side, of the bushing assembly of FIG. 15.
Figure 17:
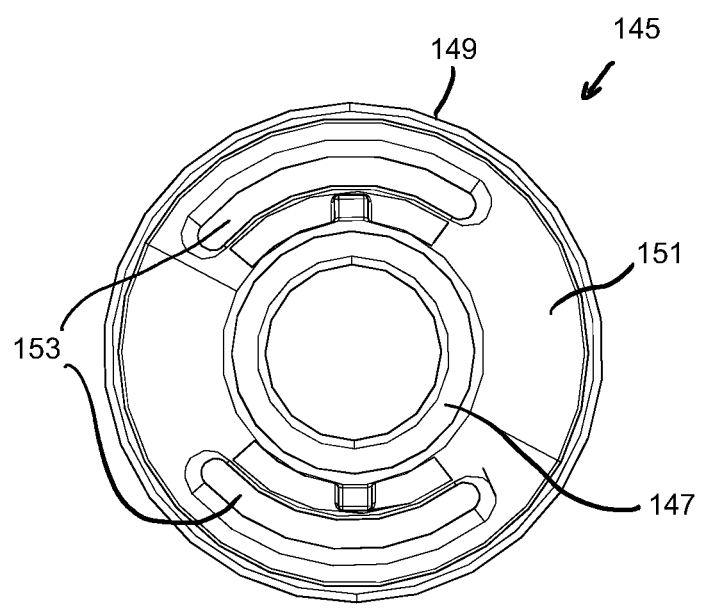
FIG. 17 is a rear elevation view of the bushing assembly of FIG. 15.

As shown in FIGS. 14 to 17, the bushing assembly 145 includes an inner bushing 147, an outer bushing 149, and a resilient element 151 interconnecting the inner and outer bushings 147, 149. The outer bushing 149 is affixed to the device connecting end 144 (i.e., to an inner periphery the device connecting end 144 defining the cylindrical opening thereof) while the inner bushing 147 is slidably mounted to the stabilizing rod 132. The resilient element 151 is generally annular and has two openings extending from a front side to a rear side of the resilient element 151. As shown in FIGS. 16 and 17, each opening 153 has a curved elongated shape having a radius centered about a central axis of the resilient element 151. The openings 153 are used to customize the resilient force of the resilient element 151. For instance, fewer or more openings 153 (or no openings 153 at all) could be provided to customize the linear and angular forces exerted by the resilient element 151. The resilient element 151 is connected between an outer peripheral surface of the inner bushing 147 and an inner peripheral surface of the outer bushing 149. In particular, the resilient element 151 is bonded to the inner and outer bushings 147, 149. In this embodiment, the resilient element 151 is made of rubber. It is contemplated that the resilient element 151 could be made of any other suitable resilient material in other embodiments.

The inner bushing 147 abuts, on either side thereof, seats 181, 185 which respectively seat the biasing members 124, 130. The seats 181, 185 are generally annular and are mounted to the stabilizing rod 132. More specifically, the front biasing members 124, 126 are disposed forward of the bushing assembly 145 (and thus the device connecting end 144) while the rear biasing members 128, 130 are disposed rearward of the bushing assembly 145. Thus, as the inner bushing 147 moves along the length of the elongate support 122, either the front biasing members 124, 126 or the rear biasing members 128, 130 are compressed and resist rotation of the track assembly about the drive wheel axis 87. Notably, with reference to FIG. 11, the front biasing members 124, 126 resist rotation of the track assembly 18 about the drive wheel axis in a direction D1 while the rear biasing members 128, 130 resist rotation of the track assembly 18 about the drive wheel axis 87 in a direction D2.

Due to the resilience of the resilient element 151, when the track assembly 18 rotates about the drive wheel axis 87, the outer bushing 149 can move relative to the inner bushing 147 to a certain degree allowed by the resilient element 151, as shown in FIG. 15. This ensures that an axis of the inner bushing 147 remains parallel and coaxial to an axis of the stabilizing rod 132. As a result, as shown in FIG. 15, the spring seats 181, 185, which are abutted by the inner bushing 147, remain oriented such that a surface thereof abutting the biasing members 124, 130 is generally perpendicularly to the axis of the stabilizing rod 132 throughout the rotation of the track assembly 18 about the drive wheel axis 87. In turn, the ends of the biasing members 124, 130, which are seated on the seats 181, 185, also remain oriented generally perpendicularly to the axis of the stabilizing rod 132. This can help reduce a bending moment applied on the biasing members 124, 130.

As will be explained in greater detail below, the resilient element 151 also resists the rotation of the track assembly 18 about the drive wheel axis 87 in either direction D1, D2.

The front biasing members 124, 126 have different biasing rates (i.e., spring rates) such that they are compressed at different rates. In particular, the distal front biasing member 126, which is closer to the front end 123 of the elongate support than the proximal front biasing member 124, has a biasing rate that is greater than the biasing rate of the proximal front biasing member 124. As such, a greater amount of force is required to compress the distal front biasing member 126 than the proximal front biasing member 124. The smaller biasing rate of the proximal front biasing member 124 reduces slack (i.e., free play) in the rotation limiting device 120 such as to reduce noise and to prevent the track assembly 18 from rotating about the drive wheel axis 87 at the slightest irregularity encountered on the ground.

In a similar manner, the rear biasing members 128, 130 have different biasing rates. In particular, the distal rear biasing member 128, which is closer to the rear end 125 of the elongate support 122 than the proximal rear biasing member 130, has a biasing rate that is greater than the biasing rate of the proximal rear biasing member 130. As such, the rotation limiting device 120 has dual biasing rates in each rotation direction.

It is contemplated that the front biasing members 124, 126 could be replaced by a dual rate spring or one single rate spring and that, similarly, the rear biasing members 128, 130 could be replaced by a dual rate spring or one single rate spring.

As briefly mentioned above, the resilient element 151 also resists rotation of the track assembly 18 about the drive wheel axis 87 in either rotation direction D1, D2. More specifically, the inner bushing 147 moves relative to the outer bushing 149 in accordance with a biasing rate of the resilient element 151. As such, in addition to the biasing rates of the front biasing members 124, 126 and the biasing rates of the rear biasing members 128, 130, when the track assembly 18 rotates about the drive wheel axis 87, the biasing rate of the resilient element 151 also resists the rotation of the track assembly 18. Thus, in this embodiment, the rotation limiting device 120 has at least two (in embodiments in which the front biasing members 124, 126 as well as the rear biasing members 128, 130 are replaced by respective single rate springs) or three biasing rates in each rotation direction D1, D2.

Furthermore, in this embodiment, the biasing rate of the resilient element 151 is greater than the biasing rates of the front biasing members 124, 126 and the rear biasing members 128, 130. As such, during rotation of the track assembly 18, the front biasing members 124, 126 or the rear biasing members 128, 130 are compressed first before the resilient element 151 deforms resiliently.

Figure 11:
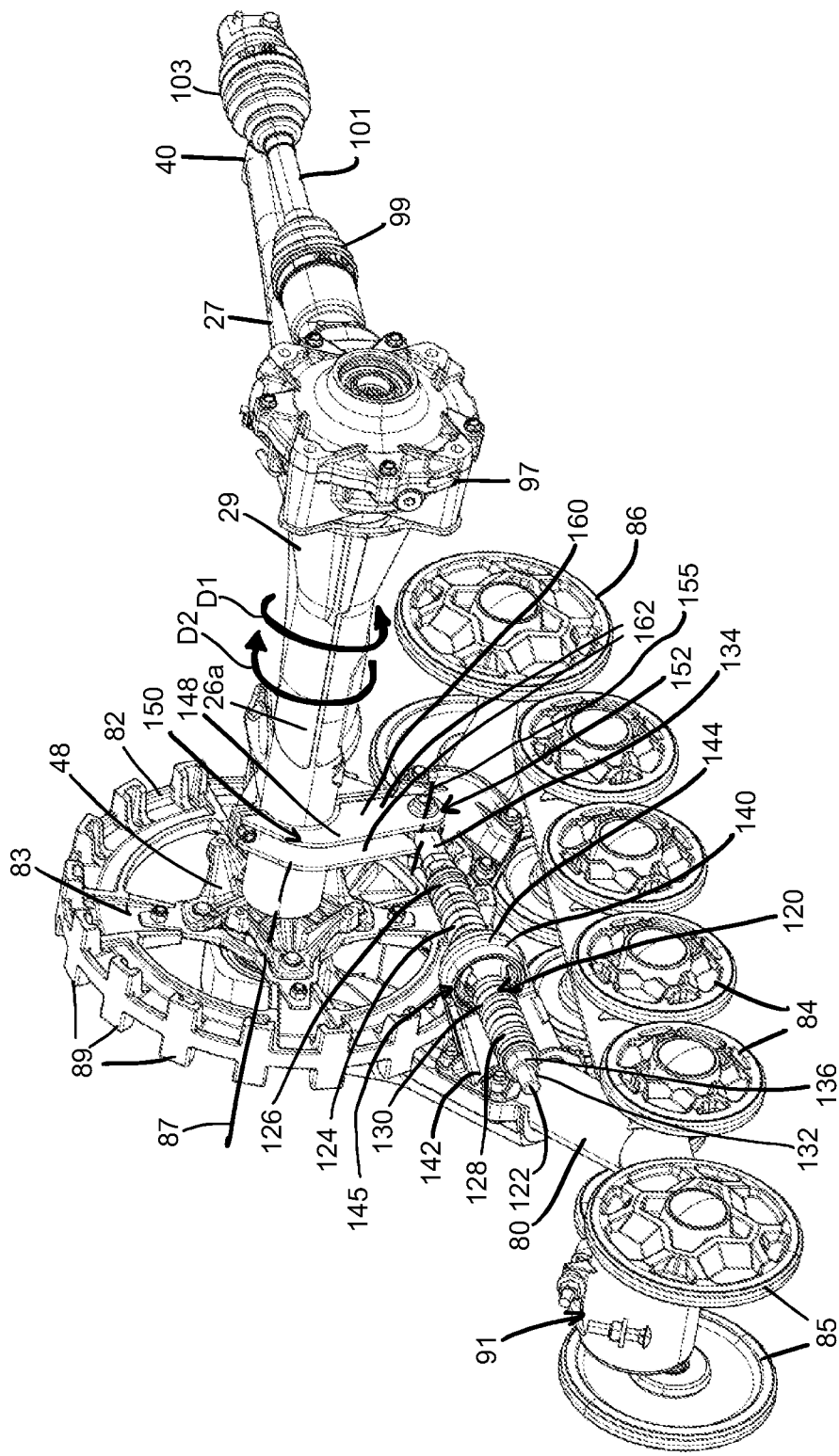
FIG. 11 is a perspective view, taken from a rear right side, of the components of FIG. 9.

The rotation limiting device 120 also has a suspension arm attachment connecting the rotation limiting device 120 to the suspension arm 26a. The suspension arm attachment 148 is disposed forward of the connection bracket 140. As shown in FIGS. 9 to 11, the suspension arm attachment 148 has an upper portion 150 and a lower portion 152 vertically lower than the upper portion 150. The lower portion is disposed vertically lower than the suspension arm 26a and, as discussed above, laterally between the inner and outer lateral edges 94, 96 of the track 88. Moreover, as shown in FIG. 11, the lower portion 152 is pivotally connected to the front end 123 of the elongate support 122 while the upper portion 150 is connected to the laterally-extending portion 29 of the suspension arm 26a.

Figure 12:
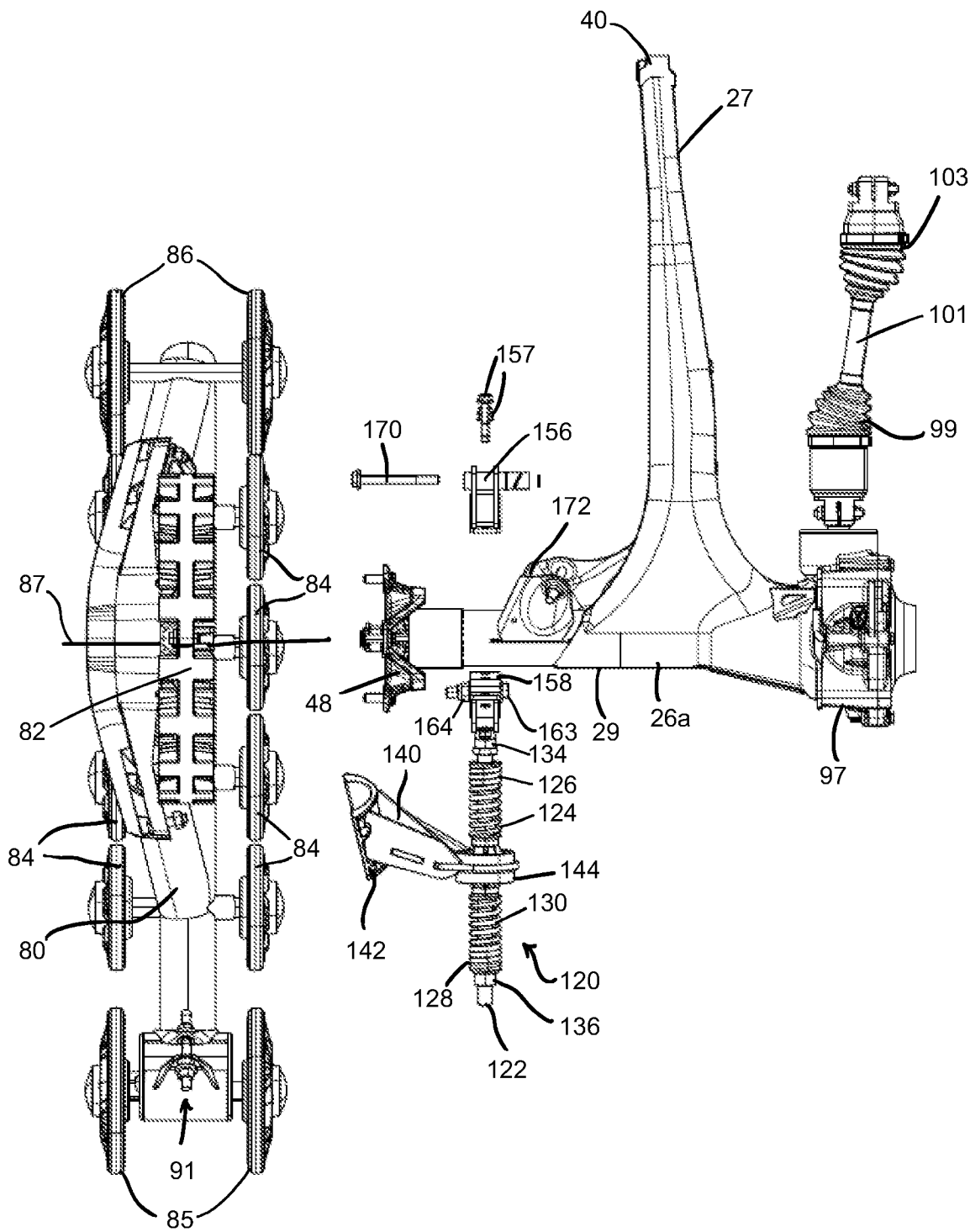
FIG. 12 is a partially exploded top plan view of the components of FIG. 13 is a right side elevation view of a rotation liming device of the left rear track assembly of FIG. 9.
Figure 13:
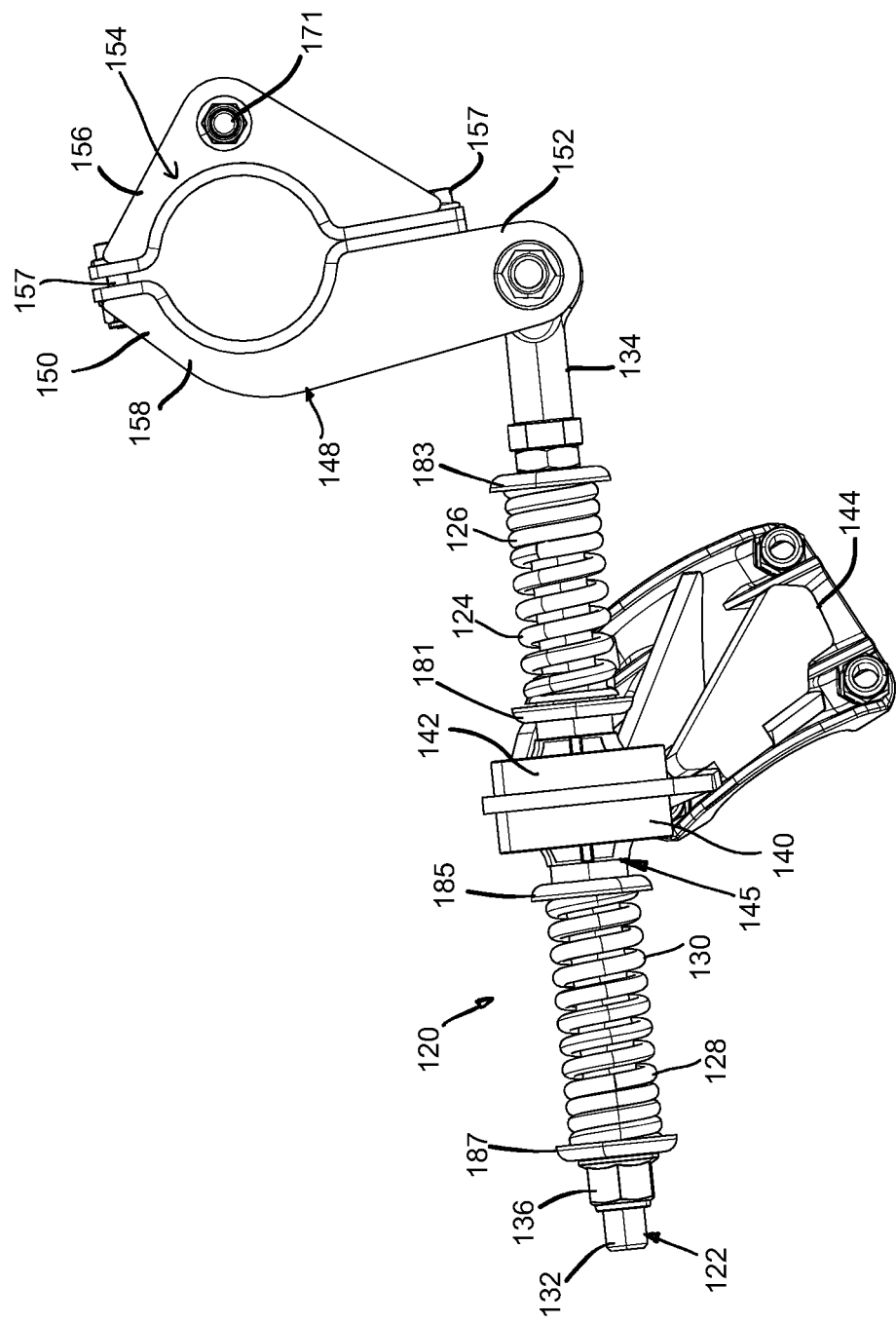
FIG. 13.

More particularly, in this embodiment, the upper portion 150 of the suspension arm attachment 148 includes a clamp 154 (FIG. 10) for connecting the upper portion 150 to the laterally-extending portion 29 of the suspension arm 26a. When connected to the suspension arm 26a, the clamp 154 surrounds a portion of the laterally-extending portion 29 of the suspension arm 26a. As shown in FIG. 12, the clamp 154 includes two halves 156, 158 which are connected to one another by fasteners 157 (FIGS. 9, 10, 13) to retain the clamp 154 onto the suspension arm 26a. More specifically, as shown in FIG. 13, when the two halves 156, 158 are secured to one another, a gap separates the two halves 156, 158 at an upper end of the clamp 154 such that, by means of the fasteners 157, the two halves 156, 158 apply a force and thus clamp down on the suspension arm 26a which prevents the suspension arm attachment from rotating about the suspension arm 26a.

Furthermore, in this embodiment, as shown in FIG. 11, the lower portion 152 of the suspension arm attachment 148 includes a connecting arm 160 having two prongs 162 extending parallel to one another. The rod end 134 of the elongate support 122 is disposed between the two members 162 and a fastener 163 (e.g., a bolt) extends through the prongs 162 of the connecting arm 160 and the rod end 134 to pivotally connect the rod end 134 to the elongate support 122 about a pivot connection axis 135 (FIG. 9) extending parallel to the drive wheel axis 87. As such, the elongate support 122, the front and rear biasing members 124, 126, 128, 130, and the front and rear stoppers 134, 136 are pivotally connected to the suspension arm 26a via the suspension arm attachment 148. The pivot connection axis 135 is disposed vertically lower than the drive wheel axis 87 everywhere between the inner lateral edge of the track 88 and a laterally innermost portion of the drive wheel 82. Another fastener 164 (e.g., a nut) securely receives the fastener 163 to retain the rod end 134 to the connecting arm 160.

The suspension arm attachment 148 locks the rotation limiting device to the suspension arm 26a in order to prevent the suspension arm attachment 148 from rotating relative to the suspension arm 26a in case the force applied by the clamp on the suspension arm 26a is not sufficient to keep the suspension arm attachment from rotating about the suspension arm 26a. To that end, with reference to FIGS. 9, 10 and 12, the track assembly 18 has a fastener 170 that extends laterally and engages the upper portion 150 of the suspension arm attachment 148 and a bracket 172 of the suspension arm 26a. In particular, in this embodiment, the bracket 172 is welded to the laterally-extending portion 29 of the suspension arm 26a and has two generally parallel walls 174 (FIG. 10) to which the lower end 33 of the shock absorber 26b is connected and a generally vertical wall 176 for connecting the suspension arm attachment 148 thereto. The fastener 170 extends through the vertical wall 176 of the bracket 172 and through the upper portion 150 of the suspension arm attachment 148 to prevent rotation of the suspension arm attachment 148 relative to the suspension arm 26a. It is contemplated that the bracket 172 could be integrally formed with the suspension arm 26a. It is also contemplated that in an alternative embodiment, the bracket 172 connects to the suspension arm attachment 148 with the fastener 170, but is not connected to the lower end 33 of the shock absorber 26b.

Figure 18:
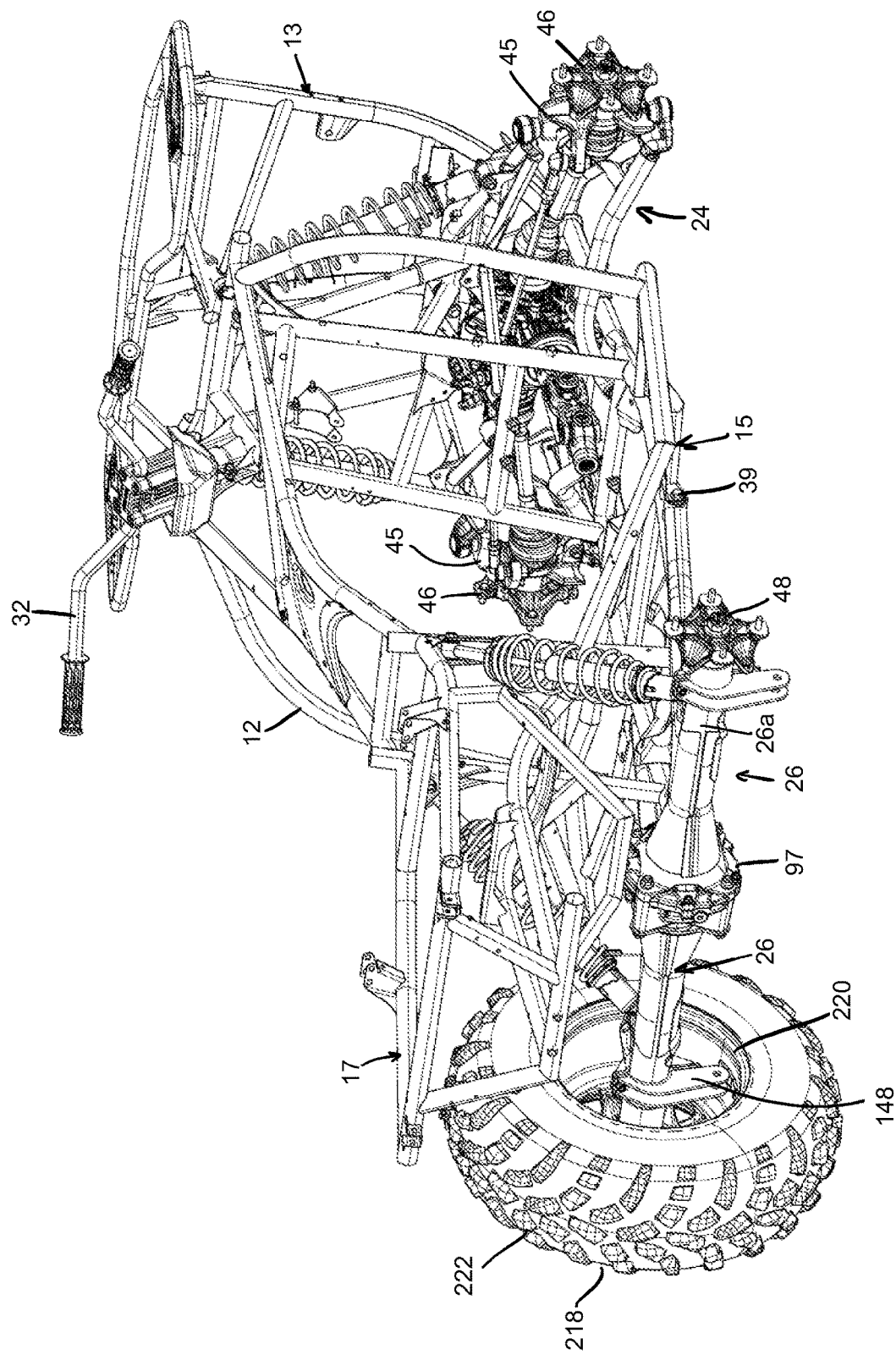
FIG. 18 is a perspective view, taken from a rear right side, of the frame, the suspension assemblies and certain steering components of the vehicle of FIG. 1, with a left ground-engaging wheel mounted to the left rear suspension assembly instead of the left rear track assembly.
Figure 19:
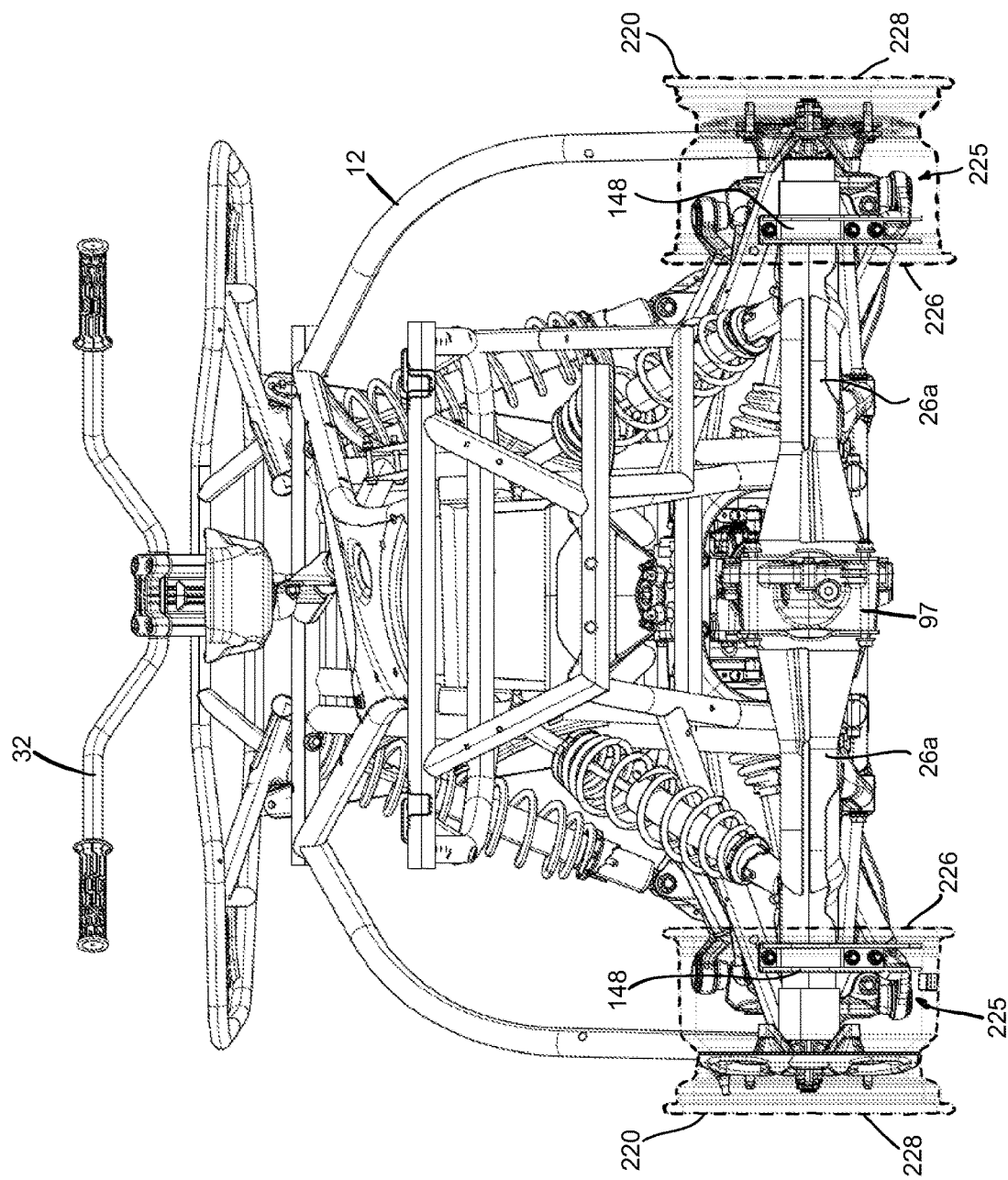
FIG. 19 is a rear elevation view of the frame, the suspension assemblies and certain steering components of the vehicle of FIG. 1, with rims of the rear ground-engaging wheels mounted to the vehicle and shown in transparency with their contours in dashed lines.

As shown in FIGS. 18 and 19, in this embodiment, the suspension arm attachment 148 remains attached to the suspension arm 26a when the track assembly is uninstalled from the ATV 10. That is, the suspension arm attachment 148 is not disconnected from the suspension arm 26a when the track assembly 18 is removed from the ATV 10. Rather, when removing the track assembly 18 from the ATV 10, for example to install a corresponding one of the ground-engaging wheels 218 in its place, the elongate support 122 is disconnected from the connecting arm 160 of the lower portion 152 of the suspension arm attachment 148 (i.e., the rod end 134 is disconnected from the connecting arm 160) and the suspension arm attachment 148 remains connected to the suspension arm 26a (via the clamp 154 and the fastener 170). This facilitates the installation/removal of the track assembly 18 onto/from the ATV 10.

Furthermore, despite the suspension arm attachment 148 remaining connected to the suspension 26a, the suspension arm attachment 148 does not perturb the installation of the ground-engaging wheel 218. Indeed, as shown in FIGS. 13 and 14, when the ground-engaging wheel 218 is installed on the ATV 10 to replace the track assembly 18, a rim 220 of the ground-engaging wheel 218, to which a tire 222 is mounted, surrounds the suspension arm attachment 148. More specifically, the rim 220 defines a partially enclosed space 225, disposed laterally between inner and outer lateral edges 226, 228 of the rim 220 (more particularly between the inner lateral edge 226 and hub of the rim 220), within which the suspension arm attachment 148 is contained.

It is contemplated that, in alternative embodiments, the suspension arm attachment 148 could be detached from the suspension arm 26a when the track assembly 18 is uninstalled from the ATV 10.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:
   a vehicle frame;
   a motor supported by the vehicle frame;
   a rear suspension assembly comprising:
   a rear suspension arm pivotally connected to the vehicle frame, the rear suspension arm including:
   a laterally extending portion;
   a half shaft disposed in the laterally extending portion, the half shaft being driven by the motor, the half shaft rotating about a drive wheel axis;
   a drive hub connected to a distal end of the half shaft; and
   at least one longitudinally extending portion, a rear end of the at least one longitudinally extending portion being fixed to the laterally extending portion, a front end of the at least one longitudinally extending portion being pivotally connected to the vehicle frame;
   a shock absorber connected between the rear suspension arm and the vehicle frame, a first end of the shock absorber being pivotally connected to the laterally extending portion, a second end of the shock absorber being pivotally connected to the vehicle frame; and
   a track assembly connected to the rear suspension arm, the half shaft being operatively connected to the track assembly for driving the track assembly,
   the track assembly comprising:
   a track assembly frame;

a plurality of track-contacting wheels, including:
a drive wheel rotationally connected to the track assembly frame, the drive wheel being rotatable about the drive wheel axis; and
at least one idler wheel rotationally connected to the track assembly frame;
an endless track disposed around the track-contacting wheels, the drive wheel being adapted for driving the endless track;
a rotation limiting device for limiting rotation of the track assembly relative to the rear suspension arm of the vehicle, the rotation limiting device being connected to the track assembly frame of the track assembly and the rear suspension arm; and
a suspension arm attachment connecting the rotation limiting device to the rear suspension arm, a first portion of the suspension arm attachment being connected and rotationally fixed relative to the laterally extending portion,
a second portion of the suspension arm attachment being pivotally connected to the rotation limiting device, the rotation limiting device pivoting about a pivot connection axis parallel to the drive wheel axis,
the suspension arm attachment being connected to the laterally extending portion between the first end of the shock absorber and the drive hub.

2. The vehicle of claim 1, wherein:
the track has an outer lateral edge and an inner lateral edge; and
the rotation limiting device is entirely disposed laterally between the outer and inner lateral edges of the track.

3. The vehicle of claim 2, wherein the rotation limiting device is entirely disposed laterally between the drive wheel and the inner lateral edge of the track.

4. The vehicle of claim 1, wherein the rotation limiting device comprises:
an elongate support; and
a plurality of biasing members supported by the elongate support.

5. The vehicle of claim 4, wherein the elongate support is disposed vertically lower than the drive wheel axis.

6. The vehicle of claim 4, wherein the suspension arm attachment is configured to remain attached to the rear suspension arm when the track assembly is uninstalled from the vehicle.

7. The vehicle of claim 6, wherein the suspension arm attachment prevents the suspension arm attachment from rotating relative to the rear suspension arm.

8. The vehicle of claim 7, further comprising a fastener configured to engage the suspension arm attachment and a portion of the rear suspension arm to lock the rotation limiting device to the rear suspension arm.

9. The vehicle of claim 6, wherein the suspension arm attachment comprises a clamp configured to at least partially surround a portion of the rear suspension arm.

10. The vehicle of claim 6, wherein:
the suspension arm attachment has an upper portion and a lower portion;
the lower portion of the suspension arm attachment is connected to the elongate support; and
the upper portion of the suspension arm attachment is configured to be connected to the rear suspension arm.

11. The vehicle of claim 10, wherein:
the track has an outer lateral edge and an inner lateral edge; and
the lower portion of the suspension arm attachment is disposed vertically lower than the rear suspension arm and laterally between the outer and inner lateral edges of the track.

12. The vehicle of claim 4, further comprising a connection bracket for connecting the rotation limiting device to the track assembly frame, wherein:
the connection bracket has a frame connecting end connected to the track assembly frame and a device connecting end connected to the rotation limiting device; and
the device connecting end is slidably mounted to the elongate support of the rotation limiting device.

13. The vehicle of claim 12, wherein the plurality of biasing members includes:
at least one front biasing member disposed forward of the device connecting end of the connection bracket, the at least one front biasing member resisting rotation of the track assembly about the drive wheel axis in a first direction; and
at least one rear biasing member disposed rearward of the device connecting end of the connection bracket, the at least one rear biasing member resisting rotation of the track assembly about the drive wheel axis in a second direction opposite the first direction.

14. The vehicle of claim 13, wherein the suspension arm attachment is disposed forward of the connection bracket.

15. The vehicle of claim 14, wherein:
the elongate support of the rotation limiting device has a front end and a rear end;
the at least one front biasing member is disposed between the device connecting end of the connection bracket and the front end of the elongate support; and
the at least one rear biasing member is disposed between the device connecting end of the connection bracket and the rear end of the elongate support.

16. The vehicle of claim 15, wherein the elongate support comprises a rod end defining the front end of the elongate support, the rod end being connected to the suspension arm attachment.

17. The vehicle of claim 13, wherein each of the at least one front biasing member and the at least one rear biasing member includes:
a first biasing member having a first biasing rate; and
a second biasing member having a second biasing rate, the first biasing rate being greater than the second biasing rate.

18. The vehicle of claim 1, further comprising a differential operatively connected to the motor, the rear suspension arm being connected to the differential such that the differential moves together with the rear suspension arm relative to the vehicle frame.

19. The vehicle of claim 1, wherein the pivot connection axis is lower than the drive wheel axis.

20. The vehicle of claim 1, wherein the first end of the shock absorber is connected to the laterally extending portion between the drive hub and the rear end of the at least one longitudinally extending portion.

* * * * *